US011707954B2

(12) United States Patent
Rimmelspacher

(10) Patent No.: US 11,707,954 B2
(45) Date of Patent: Jul. 25, 2023

(54) TRAILER DEVICE

(71) Applicant: ACPS Automotive GmbH, Ingersheim (DE)

(72) Inventor: Bernhard Rimmelspacher, Rheinstetten (DE)

(73) Assignee: ACPS AUTOMOTIVE GMBH, Ingersheim (DE)

( * ) Notice: Subject to any disclaimer, the term of this patent is extended or adjusted under 35 U.S.C. 154(b) by 134 days.

(21) Appl. No.: 17/330,739

(22) Filed: May 26, 2021

(65) Prior Publication Data
US 2021/0370731 A1 Dec. 2, 2021

(30) Foreign Application Priority Data

May 27, 2020 (DE) .......................... 102020114231.5

(51) Int. Cl.
B60D 1/54 (2006.01)
B60D 1/48 (2006.01)
B60D 1/06 (2006.01)
B60D 1/42 (2006.01)

(52) U.S. Cl.
CPC ............... *B60D 1/54* (2013.01); *B60D 1/485* (2013.01); *B60D 1/065* (2013.01); *B60D 1/42* (2013.01); *B60D 2001/544* (2013.01)

(58) Field of Classification Search
CPC .................................. B60D 1/54; B60D 1/544
See application file for complete search history.

(56) References Cited

U.S. PATENT DOCUMENTS

| 10,189,323 | B2 * | 1/2019 | Kadnikov ................ B60D 1/54 |
| 10,434,831 | B2 | 10/2019 | Rimmelspacher et al. |
| 10,717,332 | B2 | 7/2020 | Gentner et al. |
| 10,780,753 | B2 * | 9/2020 | Recker ..................... B60D 1/06 |
| 2005/0167945 | A1 | 8/2005 | Rimmelspacher et al. |
| 2014/0225350 | A1 * | 8/2014 | Gramlin ................. B60D 1/247 248/329 |
| 2017/0305219 | A1 * | 10/2017 | Gentner ................. B60D 1/485 |

FOREIGN PATENT DOCUMENTS

| DE | 102004004503 A1 | 8/2005 | |
| DE | 102008034853 A1 * | 12/2009 | ............... B60D 1/06 |
| DE | 102012004999 A1 | 9/2013 | |
| DE | 102014116000 A1 | 5/2016 | |

(Continued)

*Primary Examiner* — Kevin Hurley
(74) *Attorney, Agent, or Firm* — Reinhart Boerner Van Deuren P.C.

(57) ABSTRACT

To improve a trailer device for a motor vehicle, comprising a holding unit for a crossmember mountable on a vehicle body on the rear-end side thereof and a ball neck receiving body having a ball neck receptacle, into which an insertion portion of a ball neck carrying a coupling ball is insertable and fixable, wherein the ball neck receiving body is arranged mounted on the holding unit so as to be pivotable at least between a working position, in which a ball neck is insertable by means of its insertion portion into the ball neck receptacle, and a rest position, it is proposed that the trailer device comprises a drive, which is coupled to the ball neck receiving body by means of a coupling unit which has a freewheel and which in particular comprises a plurality of coupling elements.

29 Claims, 18 Drawing Sheets

(56) References Cited

FOREIGN PATENT DOCUMENTS

| | | | | |
|---|---|---|---|---|
| DE | 102015115357 A1 | * | 3/2017 | ............... B60D 1/06 |
| DE | 102016107302 A1 | | 10/2017 | |
| DE | 102017102505 A1 | * | 8/2018 | ............... B60D 1/06 |
| EP | 1504928 B1 | * | 2/2006 | ............. B60D 1/246 |
| EP | 2952368 A2 | * | 12/2015 | ............... B60D 1/06 |
| EP | 3456555 A1 | | 3/2019 | |

* cited by examiner

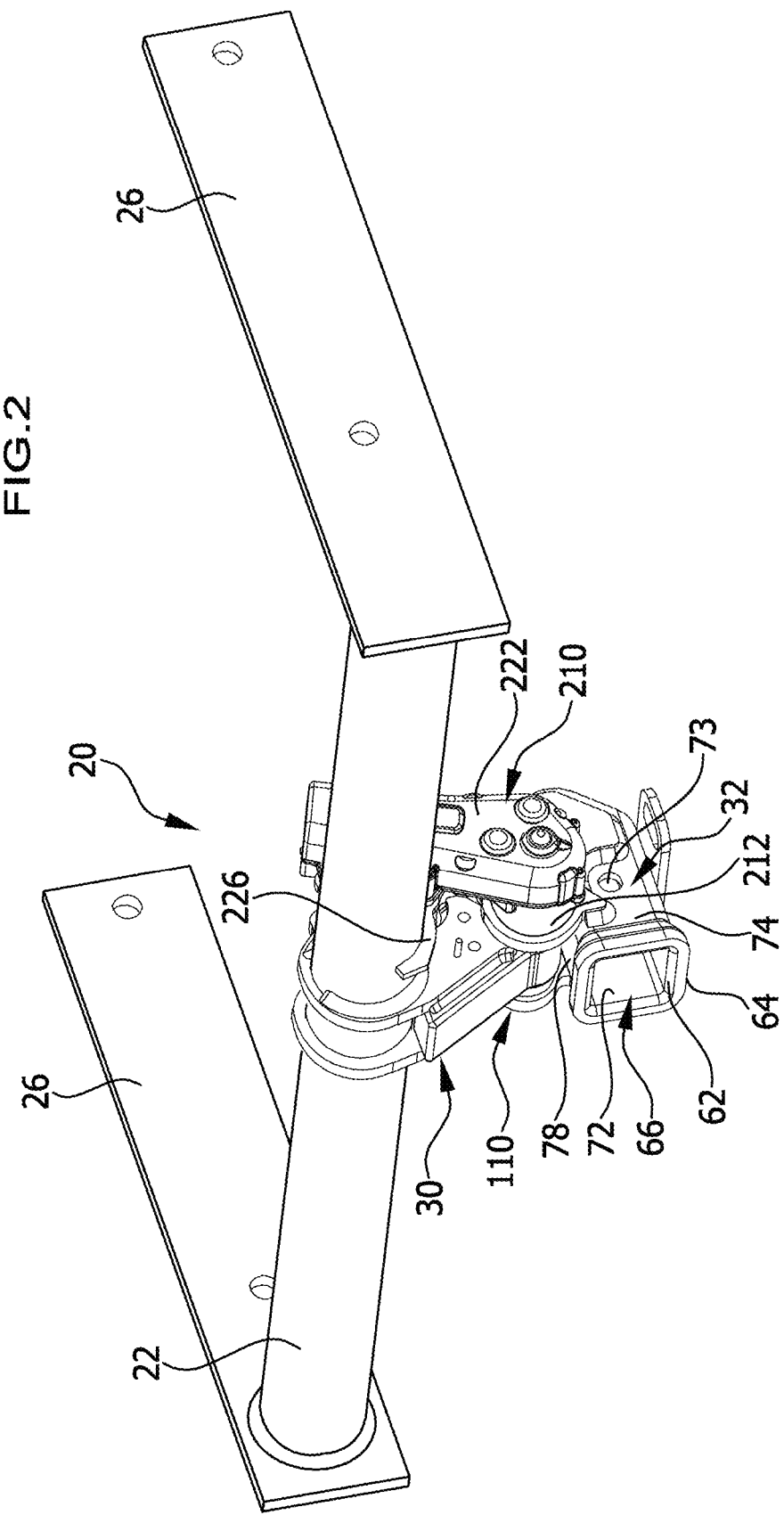

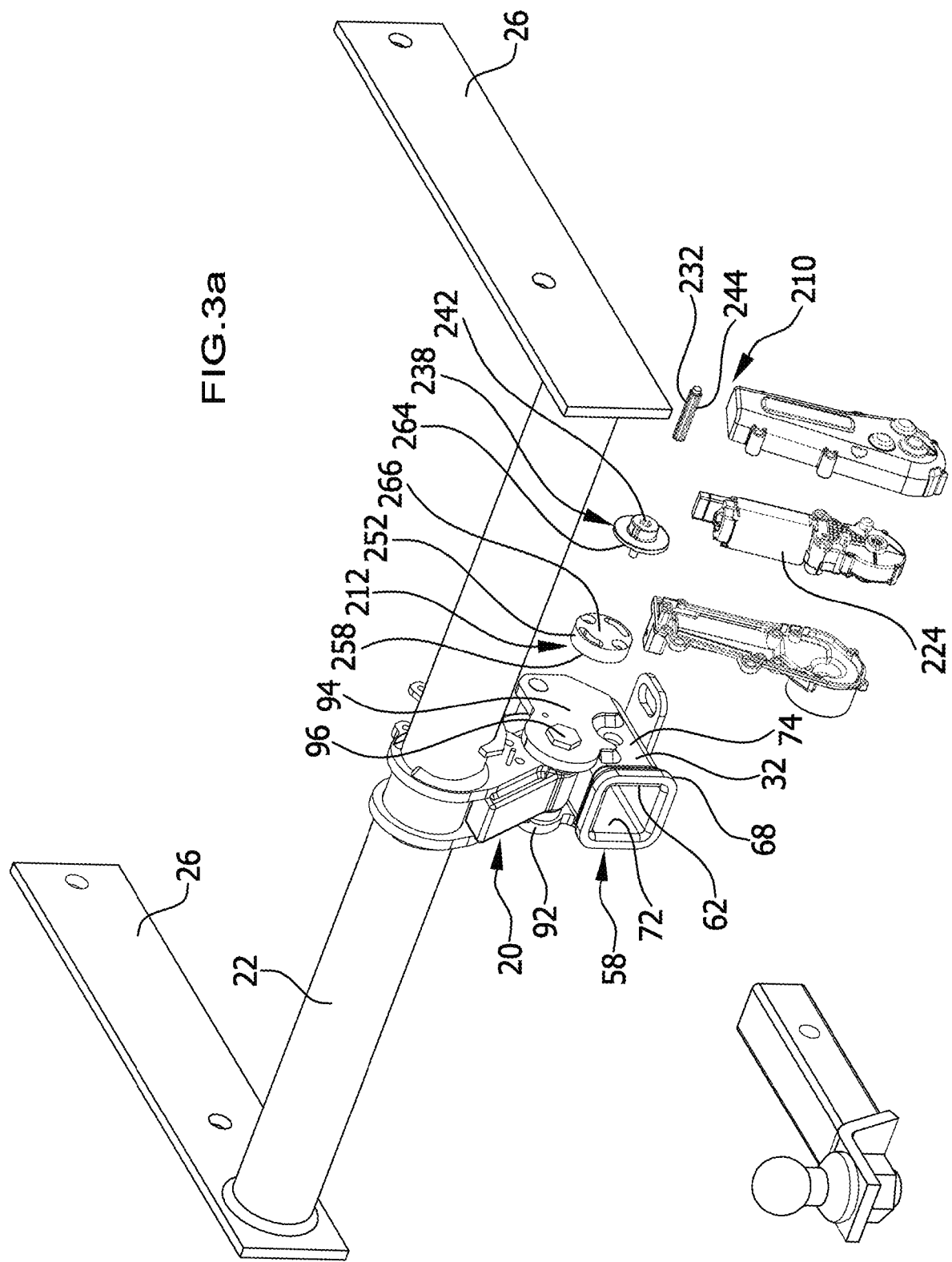

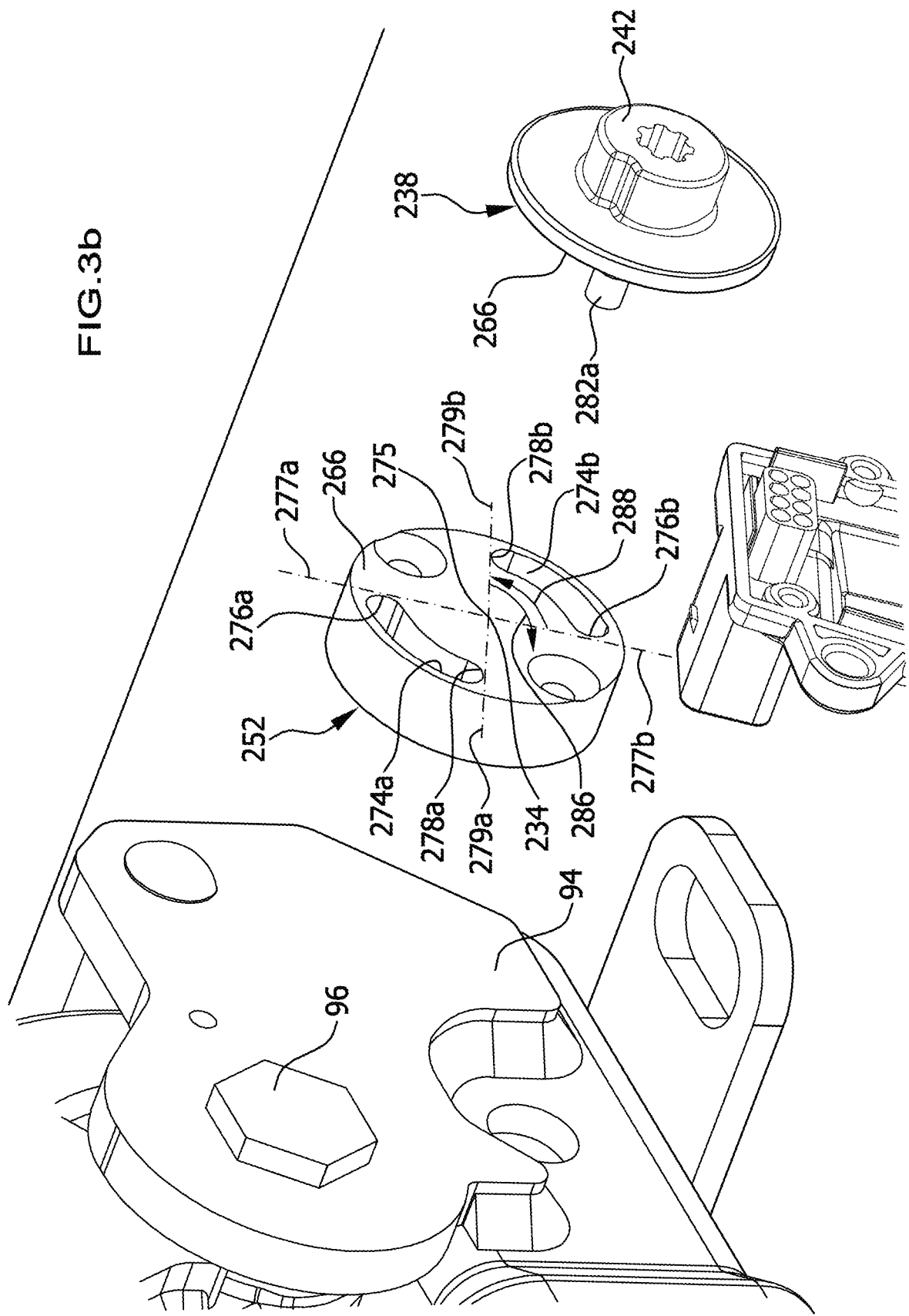

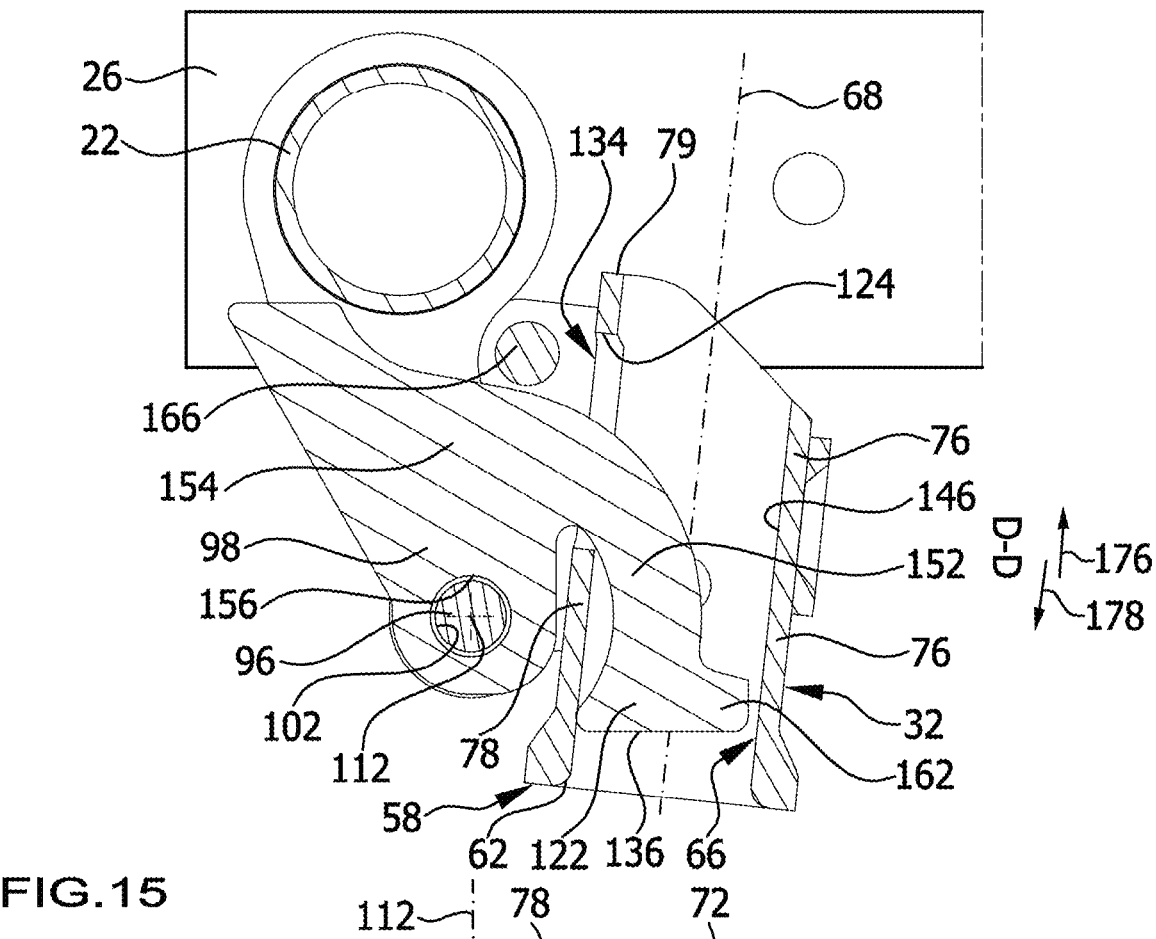
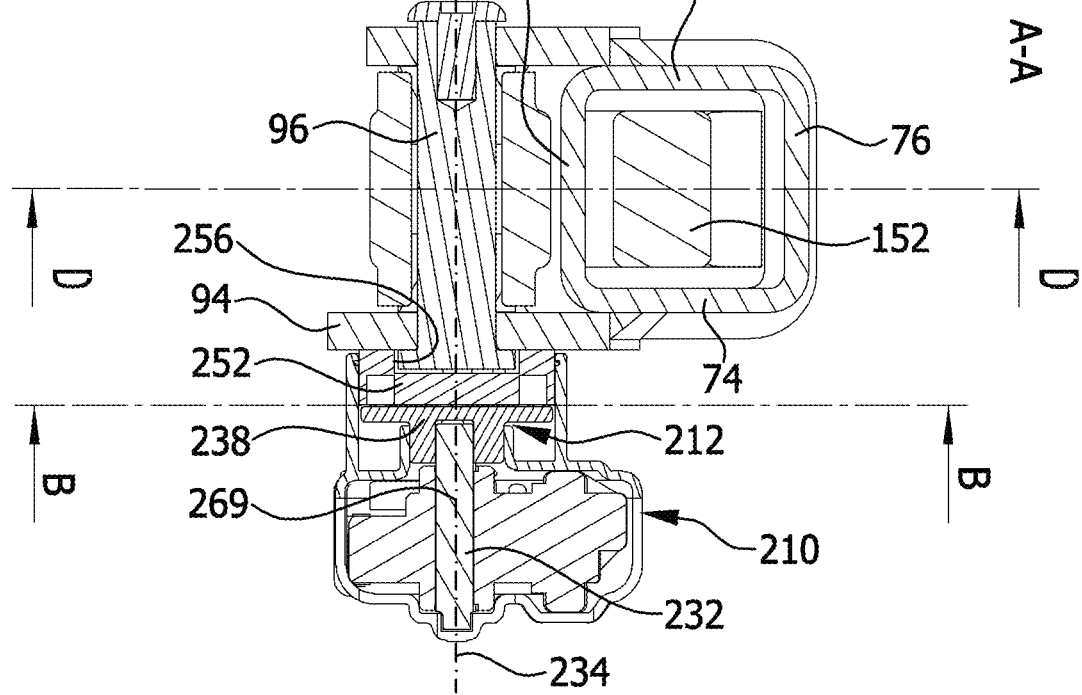
FIG.15

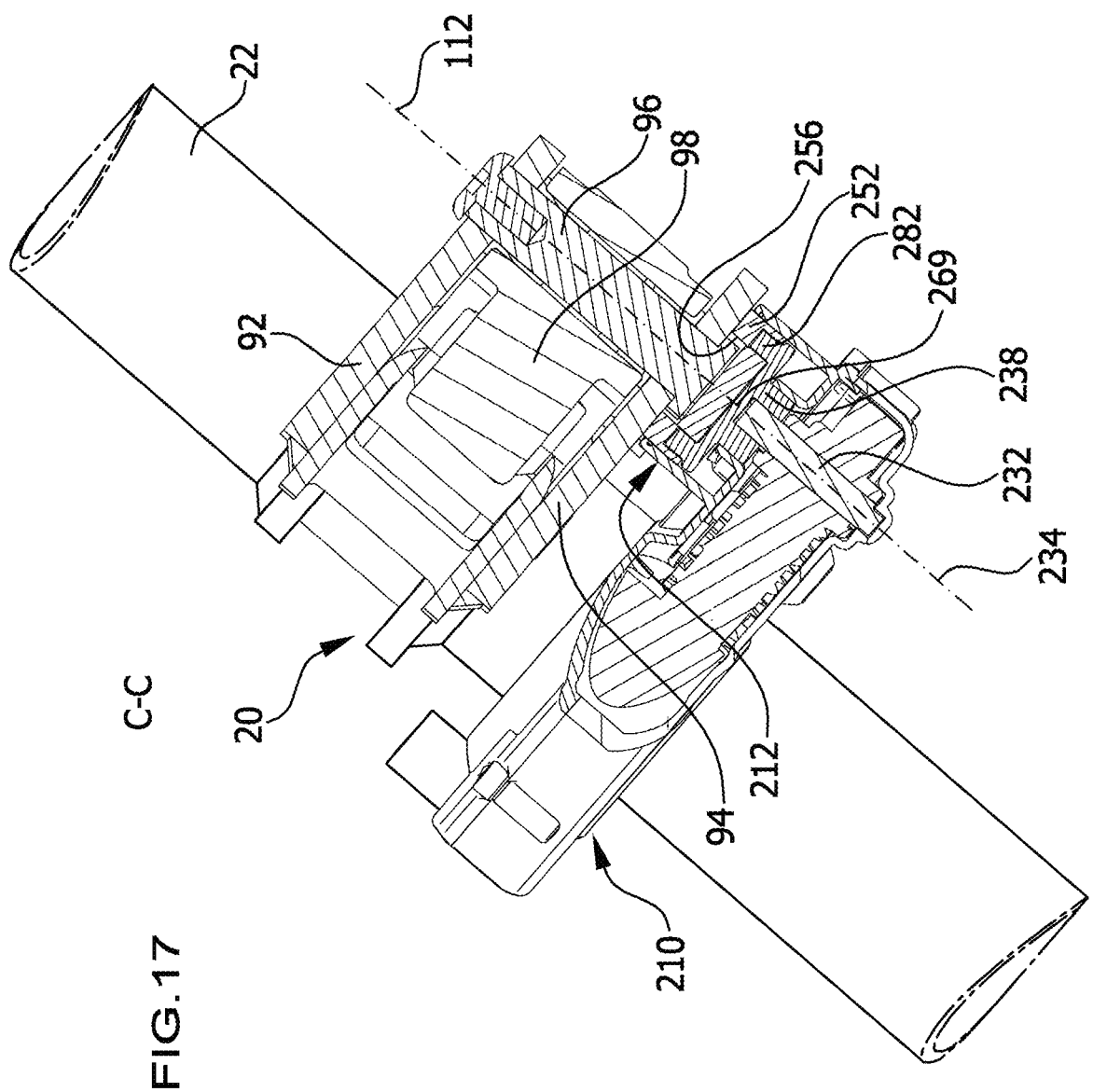

TRAILER DEVICE

CROSS REFERENCE TO RELATED PATENT APPLICATION

This patent application claims the benefit of German application number 10 2020 114 231.5 of 27 May 2020, the teachings and disclosures of which are hereby incorporated by reference thereto in their entirety and for all purposes.

BACKGROUND OF THE INVENTION

The invention relates to a trailer device for a motor vehicle, comprising a holding unit and a ball neck receiving body having a ball neck receptacle, wherein the holding unit is intended for assembly on a crossmember mountable on a vehicle body on the rear-end side thereof, and wherein an insertion portion of a ball neck carrying a coupling ball is insertable and fixable in the ball neck receptacle, wherein the ball neck receiving body is arranged mounted on the holding unit so as to be pivotable at least between a working position, in which a ball neck is insertable with its insertion portion into the ball neck receptacle, and a rest position.

For example, a trailer device is known from DE 10 2016 107 302 A1.

One aspect of the invention is to provide an improved trailer device.

SUMMARY OF THE INVENTION

In embodiments of the invention a trailer device of the kind described at the outset comprises a drive which is coupled to the ball neck receiving body by means of a coupling unit having a freewheel, wherein the coupling unit in particular comprises a plurality of coupling elements.

One of the advantages of embodiments of the invention is considered, for example, to lie in the fact that the ball neck receiving body can be pivoted by means of the drive coupled to it from the working position into the rest position and vice versa, thus increasing the ease-of-use of the trailer device.

In particular, it is also advantageous that a risk of injury to a user is at least reduced by the freewheel in the coupling unit, since, if the user's finger blocks a pivot path of the ball neck receiving body as this is pivoted, the drive in the freewheel can continue to move without entraining the ball neck receiving body and therefore without catching the user's finger.

No further details have been provided previously in respect of further embodiments of the trailer device.

It is particularly expedient if the ball neck receiving body is loaded by a force in the direction towards the working position. In particular, a pivoting of the ball neck receiving body into the working position is hereby at least assisted with the provided freewheel.

For example, the force is effective at least in the rest position.

In particular, the force is effective until the ball neck receiving body reaches the working position.

For example, in some embodiments, a device exerting a force onto the ball neck receiving body, for example a spring, is provided for loading the ball neck receiving body.

It is particularly advantageous, however, if the trailer device is constructed in such a way that, in an operating state, the ball neck receiving body is loaded by the effect of the force of gravity in the direction towards the working position. In particular, the loading is hereby realized in a structurally simple manner, without the need for further elements for this loading.

In the foregoing and hereinafter, an operating state shall be understood in particular to mean that the trailer device is mounted correctly on a motor vehicle, and in particular that the motor vehicle is on an at least approximately horizontal road surface. In particular, the reference to at least one operating state in conjunction with a feature shall be understood insofar the trailer device is constructed in such a way that when it is in an operating state the feature is realized, preferably in combination with further features of the operating state.

No further details have been provided previously in respect of the configuration of the coupling unit and possible states thereof.

In particular, the coupling arrangement has at least one coupling state, in particular a plurality of coupling states. Hereinafter, the reference to at least one coupling state in conjunction with a feature shall be understood in particular to mean that this feature, in particular in combination with further features, is realized in the one coupling state or in one or some of the plurality of coupling states.

In particular, it is provided that, in at least one coupling state, the coupling unit force-transmittingly connects the drive and the ball neck receiving body in at least one coupling direction, preferably to influence a movement of the ball neck receiving body, and, by means of the freewheel of the coupling unit, allows at least a relative movement between the ball neck receiving body and the drive in a freewheel direction. The force-transmitting connection is effective in particular in respect of at least a relative movement of the ball neck receiving body in relation to the drive. A movement of the ball neck receiving body can thus be influenced advantageously by the force-transmitting connection by means of the drive, however, a relative movement between the drive and the ball neck receiving body in the freewheel direction is made possible, for example, in the event that the ball neck receiving body is blocked, in order to at least reduce damage to the blocking element, for example a user's finger, or damage to the blocked ball neck receiving body or drive if the drive keeps running.

It is particularly expedient if, at least in one coupling state, the coupling direction and the freewheel direction are oriented oppositely to one another, for example if the coupling element acts in the coupling direction in a braking and/or blocking manner on the ball neck receiving body against a movement thereof into the working position effected by the loading force.

In particular, it is provided that, in at least one coupling state, the loading of the ball neck receiving body by the force holds said ball neck receiving body in the force-transmitting connection of the coupling unit, and for example thus assists the cooperation between drive and ball neck receiving body.

Here, it is advantageous if the loading of the ball neck receiving body by the force acts in the direction of the freewheel direction and thus in particular holds the ball neck receiving body and the drive in the force-transmitting connection. For example, it is hereby made possible that the drive effects a movement in the freewheel direction and the ball neck receiving body, provided it is not blocked, is entrained by the loading with the force, and in addition the drive remains uninfluenced by a possible blocking of the ball neck receiving body.

In particularly preferred embodiments, the coupling unit acts in at least one coupling state against a pivoting of the ball neck receiving body into the working position, effected by the loading by the force, whereby the ball neck receiving body is advantageously guided more gently into the working position and is thus stressed to a lesser extent.

In particular, it is provided that the coupling unit, in at least one coupling state, in particular in a plurality of coupling states, transfers a guiding movement from the drive onto the ball neck receiving body, in particular transmits a guiding rotary movement from the drive onto the ball neck receiving body. The ball neck receiving body can thus advantageously be moved between the rest position and the work position and back by means of the driver.

It is particularly expedient if, in at least one coupling state transmitting a guiding movement, the drive together with the coupling unit guides the ball neck receiving body in a braking manner in the direction towards the working position and also a movement, effected by the loading of the ball neck receiving body by a force, in the direction towards the working position of the ball neck receiving body, and in particular guides it until in the working position. In particular, the drive together with the coupling unit, in this coupling state, thus counteracts the loading of force on the ball neck receiving body in a braking manner, since the ball neck receiving body for example moves more slowly in the direction towards the working position as compared with a movement of the ball neck receiving body into the working position with only the force of the loading acting on said ball neck receiving body. The ball neck receiving body can thus be moved in a carefully guided manner into the working position by means of the drive.

In particularly advantageous embodiments, the drive together with the coupling unit, in at least one coupling state transmitting a guiding movement, also moves the ball neck receiving body in a force-loading manner, in particular from the rest position, in the direction towards the working position. This is expedient for example if the ball neck receiving body remains substantially in the rest position as a result in particular of interfering influences caused by soiling or wear and is then also moved in this coupling state from the rest position in the direction towards the working position by the loading of force by the drive.

It is preferably provided here that, in a basic position in the rest position, the coupling unit together with the drive and the ball neck receiving body is in the coupling state, in which the drive together with the coupling unit would guide the ball neck receiving body in a braking manner, and, if the drive provides a movement in the direction towards the working position and the ball neck receiving body remains stuck in the rest position, the freewheel of the coupling unit is first passed through and then the coupling unit is placed in the coupling state, in which the ball neck receiving body is also moved under a loading with force, in order to thus release it from its state stuck in the rest position. For example, by means of the loading of force by the drive and the coupling unit in the last coupling state, the blocking interfering influence on the ball neck receiving body could be substantially fully overcome, so that said ball neck receiving body for example moves firstly, as a result of the loading with a force, quickly in the direction towards the working position and then the coupling unit assumes the coupling state, in which the ball neck receiving body is guided in a braking manner, in order to thus move the ball neck receiving body carefully into the working position. However, the blocking interfering influence might not be substantially fully overcome by means of the loading with force by the drive and the coupling unit, and therefore the ball neck receiving body is moved at least partially in the direction towards the working position at least by means of this loading with force by the drive, and a user of the trailer device must still implement only a remaining pivot into the working position, for example manually, wherein the remaining pivot corresponds in particular substantially to the relative movement between the ball neck receiving body and the drive permitted by the freewheel.

In expedient embodiments, it is provided that, in at least one coupling state transmitting a guiding movement, the drive together with the coupling unit moves the ball neck receiving body in a guiding manner in the direction towards the rest position, and in particular moves the ball neck receiving body in a guiding manner until in the rest position. In particular, it is provided here that the drive together with the coupling unit moves the ball neck receiving body in a guiding manner, loaded by force, in the direction towards the rest position, for example against the loading of the ball neck receiving body by a force.

No further detailed information has been provided previously in respect of the freewheel of the coupling unit.

It is particularly expedient if the freewheel of the coupling unit permits a limited relative movement between the drive and the ball neck receiving body, in particular a relative rotation in an angular range of free rotation. In particular, a decoupling between the drive and the ball neck receiving body is hereby advantageously made possible, and damage is at least reduced or even completely prevented if one of the two is blocked relative to a movement of the other, and for example a risk of injury for a user of the trailer device by trapping a finger is at least reduced.

It is particularly advantageous here if the freewheel of the coupling unit, in at least one coupling state, permits a movement, effected by the drive, in the direction towards the working position relative to the ball neck receiving body, so that in particular in the event of this movement, which is critical in respect of the trapping of a user's finger, the advantageous effect of the freewheel can take hold.

In particularly preferred embodiments, it is provided that, in at least one coupling state with a ball neck receiving body blocked in respect of its pivotability, the coupling unit is placed in a freewheeling state, in particular in cooperation with the drive. The risk of the finger of a user of the trailer device becoming trapped is hereby preferably at least reduced, since, if the user blocks the ball neck receiving body by his finger, continued running of the drive does not directly result in the finger becoming trapped.

In particular, in the freewheeling state, the drive and the ball neck receiving body are not connected force-transmittingly and/or movement-transmittingly by the coupling unit. In particular, the coupling unit does not provide a transfer of force and/or movement in this freewheeling state.

The coupling unit, and the ball neck receiving body in particular together with the drive, is preferably constructed in such a way that, with a ball neck receiving body positioned in the rest position, the coupling unit is in a force-transmitting coupling state and for example thus fixes the ball neck receiving body in the rest position.

The coupling unit is preferably constructed with its freewheel in such a way that the coupling unit, by means of the freewheel, permits a pivoting about a pivot axis of the ball neck receiving body, in particular in an angular range of free rotation, preferably relative to the drive, at least over a freewheel range which in particular represents a part of the pivot path between the rest position and the working position.

In particular, it is provided that, in the working position, the coupling unit, by means of the freewheel, permits a pivoting of the ball neck receiving body in the direction towards the rest position, at least over a freewheel range which in particular represents a part of the pivot path between the rest position and the working position. For example, it is hereby achieved that pivoting of the ball neck receiving body in the working position is still enabled at least in part, and therefore for example the risk of a user's finger being caught is at least reduced.

In this case, in particular the construction of the coupling unit in such a way that this allows a pivoting of the ball neck receiving body at least in some regions in the freewheel range shall be understood in such a way that it does not block a corresponding pivoting, but additional stop elements may be provided and preferably are provided, which blocking elements, for example in cooperation with an inserted insertion portion, can block a pivoting of the ball neck receiving body in particular in the working position, so that said ball neck receiving body in the working position can be fixed in a sufficiently stable manner for trailer operation and can be fixed.

For example, as a result of the configuration of the trailer device, the pivoting of the ball neck receiving body permitted by the freewheel at least in some regions at least in the pivot range between the working position and the rest position is always possible provided there is no insertion portion inserted into the ball neck receptacle.

In particular, the coupling unit can be placed, by a rotary movement about a coupling axis, in at least one freewheeling state and/or different coupling states.

In particular, the coupling unit has at least one freewheeling state, in which the coupling unit permits a relative rotation, in particular of the ball neck receiving body relative to the drive, in two opposite directions of rotation about the coupling axis, for example within a predefined angular range of free rotation.

For example, the coupling unit is placed into a corresponding coupling state by a rotary movement of at least one coupling element. Alternatively or additionally, it is expediently provided that the coupling unit can be placed into an appropriate coupling state by a rotary movement induced by a pivot movement of the ball neck receiving body and/or by the drive.

For example, it is hereby made possible that, if the coupling unit is in a freewheeling state, the drive can set the coupling unit into a force-transmitting coupling state by means of a rotary movement, and then can transfer the rotary movement to the ball neck receiving body.

In principle, the coupling axis, a pivot axis about which the ball neck receiving body is arranged pivotably mounted on the holding unit, and a drive rotation axis about which the drive provides and effects a rotary movement, could be oriented differently from one another.

However, it is preferably provided that the coupling axis, the drive rotation axis, and the pivot axis run at least approximately parallel to one another, and in particular the coupling unit thus can be constructed in a structurally simple and reliable manner, and a rotary movement effected by the drive, which rotary movement is transferred from the coupling unit, acts substantially directly on a pivot movement of the ball neck receiving body about the pivot axis. It is particularly advantageous if the coupling axis, the drive axis and the pivot axis coincide at least approximately.

No further details have been provided previously in respect of the coupling elements.

In particular, it is provided that at least two coupling elements are mounted within the predefined angular range of free rotation rotatably relative to one another about the coupling axis and thus for example realize the freewheel of the coupling unit and in particular define the freewheel range. For example, the coupling elements mounted rotatably relative to one another are a receptacle-side coupling element and a drive-side coupling element and/or positive-locking elements that engaging one another and/or a coupling element having a guide receptacle and also a coupling element engaging therein.

In expedient embodiments, it is provided that the predefined angular range of free rotation is at least 10°, in particular at least 30°. It is preferably provided that the angular range of free rotation is at most 90°, in particular at most 60°. In particular, the freewheel given by the angular range of free rotation is hereby large enough for its advantageous effects to take hold and is not so large as not to offer good functionality of the trailer device.

It is particularly expedient if the size of the angular range of free rotation is dimensioned relative to the size of a pivot angle, wherein the size of the pivot angle is the angle about which the ball neck receiving body is to be pivoted from the rest position into the working position and vice versa.

It is preferably provided that the predefined angular range of free rotation corresponds at least to a tenth, in particular at least a quarter, for example at least a third of the size of the pivot angle, for example in order to achieve sufficient free clearance in the event that a pivot movement of the ball neck receiving body is blocked, in particular in order to sufficiently cover a pivot range that is easily achieved by a user using his hand, just before the working position is reached, for example in order to avoid, to the greatest extent, any injuries caused by the user's hand being caught.

In particular, the predefined angular range of free rotation corresponds at most to the size of the pivot angle, preferably at most three quarters, for example at most two thirds of the size of the pivot angle, so that in particular the freewheel and therefore a free pivoting of the ball neck receiving body is not too large, and for example signs of wear associated therewith are kept low.

It is particularly preferred if the predefined angular range of free rotation is at least approximately half of the pivot angle.

In particularly expedient embodiments, it is provided that at least two coupling elements are constructed as positive-locking elements engaging in one another, wherein, in particular as a result of the fact that when the mutually engaging positive-locking elements are arranged in a relative position in relation to one another in which they have a positive-locking fit, a coupling, in particular a force-transmitting coupling, is produced in a structurally simple way.

In particular, it is expedient if the positive-locking elements engaging in one another have a positive-locking fit depending on their relative positions in relation to one another which can be adopted in the coupling unit. They are preferably mounted in such a way that, within the coupling unit, they can be placed in at least one relative position, for example in two coupling fit relative positions, in which they are connected to one another in a positive-locking and in particular force-transmitting manner, and can be placed within the coupling unit in at least one relative position, in particular in relative positions taken up along a path running between the two coupling fit relative positions, in which relative positions they are arranged movably relative to one another at least in one direction, in particular along the path of these relative positions. The positive-locking elements therefore expediently can be placed in at least one relative position, in which, as a result of the coupling hereby provided, a transfer of force is realized from the drive to the ball neck receiving body in order to influence a pivoting thereof or in order to fix the ball neck receiving body for example by means of a blocked drive, and the positive-locking elements also can be placed in at least one relative position in which the coupling unit is released in such a way that the ball neck receiving body is freely pivotable relative to the drive in a predefined direction and within a predefined stretch.

It is particularly advantageous if at least one coupling element has a guide receptacle, in which at least one further coupling element engages, whereby in particular the coupling thereof has both a freewheel along a guide of the engaging coupling element in the guide receptacle and at least one force-transmitting coupling state when the engaging coupling element strikes against a delimitation of the guide receptacle.

It is particularly advantageous here if the guide path is substantially in the form of an arc around the coupling axis, so that in particular a relative rotation of the coupling elements in relation to one another is made possible.

The center point of the arc expediently lies at least approximately on the axis about which the arc runs, and a center point angle of the arc corresponds substantially to the size of the angular range of free rotation.

It is particularly expedient if at least one coupling element forms a stop, by means of which the ball neck receiving body in the rest position is fixed in particular at least in respect of a movement in the direction towards the working position. The ball neck receiving body is hereby preferably fixed against its loading.

For example, the stop could act directly on the ball neck receiving body.

At least two coupling elements, however, preferably form the stop, so that there is no need for an additional provision of a stop acting on the ball neck receiving body.

It is particularly expedient if at least one coupling element of the ball neck receiving body forming a stop is applied in the rest position directly or indirectly against a stop of the holding unit, and in particular the ball neck body is thus held in a stable manner in the rest position.

At least one coupling element is preferably fixedly connected to the ball neck receiving body, for example arranged directly thereon or arranged on a bearing element by means of which the ball neck receiving body is arranged pivotably on the holding unit.

In particular, a coupling element directly connected to the drive element and the coupling element fixedly connected to the ball neck receiving body are directly coupled to one another.

No detailed information has been provided previously in respect of the pivotable arrangement of the ball neck receiving body on the holding unit.

It is preferably provided that the ball neck receiving body, in particular in the working position and almost as far as the rest position, is arranged on the holding unit so as to be freely pivotable relative to the holding unit at least within the freewheel range, so that in particular the holding unit at least does not hinder the pivotability of the ball neck receiving body between the rest position and the working position. In particular, the expression "almost as far as the rest position" shall be understood to mean that a pivoting of the ball neck receiving body beyond the rest position in a direction oriented opposite to the direction towards the working position is not possible, in particular such a pivoting is blocked by a stop of the holding unit, and therefore, in the region of the rest position, the free pivotability of the ball neck receiving body in the freewheel range is limited in the region of the rest position, and a pivoting in the freewheel range beyond the rest position opposite to the direction towards the working position is not possible.

It is particularly advantageous if the ball neck receiving body is loaded by the force of gravity in the direction towards the working position as a result of the pivotable arrangement of the ball neck receiving body on the holding unit.

In particular, in some embodiments, the pivotable arrangement is therefore constructed such that, at least in an operating state, the ball neck receiving body, without any effect of the coupling unit and in particular the drive, would always be moved at least approximately into the working position by the loading with force, for example effected by the force of gravity.

No further details have been provided previously in respect of the arrangement of the ball neck receiving body in the rest position.

In particular, it is provided that the trailer device is configured in such a way that, at least in an operating state, a center axis of the ball neck receptacle in the rest position runs at least approximately vertically.

In particular, the insertion portion is insertable and is to be inserted into the ball neck receptacle at least approximately in a direction axial to the center axis.

In particular, it is advantageous if, at least in an operating state, the ball neck receiving body in the rest position is arranged higher than in the working position based on the direction of the force of gravity.

In particular, it is provided that the ball neck receiving body is arranged pivotably on the holding unit in such a way that, in the rest position, the ball neck receiving body is arranged substantially in front of the pivot axis, wherein the orientation in front of the pivot axis shall be understood insofar as, when a trailer device is installed correctly on a motor vehicle, the ball neck receiving body in the rest position is arranged in front of the pivot axis based on the direction of forward travel of the motor vehicle, for example so as to be able to place the ball neck receiving body in the rest position in a space-saving manner and outside a field of view.

It is furthermore advantageously provided that, at least in an operating state, in the rest position the insertion opening of the ball neck receiving body substantially faces the road surface and/or an end region of the ball neck receiving body forming the insertion opening is a lowest region of the ball neck receiving body based on the direction of the force of gravity.

In particular, it is provided that, at least in an operating state, the ball neck receiving body in the rest position is arranged on a side of the pivot axis facing the vehicle body, in particular a rear-end region of the vehicle body.

For example, the ball neck receiving body in the rest position is arranged in a receiving space of the holding unit, wherein the receiving space lies in particular between two side parts of the holding unit by means of which the holding unit is attachable or is attached to a crossmember.

No further specific details have been provided previously in respect of the arrangement of the ball neck receiving body in the working position.

In particular, it is provided that, at least in an operating state, the ball neck receiving body in the working position is arranged beneath the pivot axis based on the direction of the force of gravity.

It is particularly expedient if, at least in an operating state, the ball neck receiving body in the working position is arranged beneath a plane defined by a lower edge of a bumper unit of the motor vehicle and parallel to the road surface, based on the direction of the force of gravity.

In particular, at least in an operating state, a center axis of the ball neck receiving body in the working position runs at least approximately parallel to a plane through the road surface, that is to say, in the case of a horizontal road surface, the center axis runs at least approximately horizontally.

No detailed information has been provided previously in respect of the specific embodiment of the pivotable arrangement of the ball neck receiving body on the holding unit.

In particular, the ball neck receiving body is mounted pivotably about a pivot axis between the working position and the rest position and vice versa.

In this case, the pivot angle through which the ball neck receiving body is to be pivoted starting from the rest position to the working position and vice versa, in particular about the pivot axis, is for example at least 45°, preferably at least 60°, and/or in particular at most 140°, expediently at most 120°. It is particularly preferred if the pivot angle is at least approximately 90°.

In particular, in at least one operating state, the pivot axis runs at least approximately perpendicularly to a longitudinal direction of the vehicle.

It is preferably provided that the pivot axis runs at least approximately parallel to a longitudinal extent of the crossmember.

The ball neck receiving body is preferably pivotable in particular relative to the holding unit and for example relative to the crossmember about only one single pivot axis.

In particular, a pivot bearing unit is provided for the pivotable arrangement of the ball neck receiving body. In particular, the pivot bearing unit comprises a bearing pin, which in particular by means of its longitudinal extent defines the pivot axis about which the ball neck receiving body is pivotable.

In particular, the ball neck receiving body is arranged on the bearing pin so as to be pivotable about the pivot axis, in particular by means of bearing elements, wherein the bearing elements are connected to the ball neck receiving body or form parts of the ball neck receiving body of the bearing elements.

In particular, the pivot bearing unit comprises a pin support, on which the bearing pin is for example mounted rotatably or fixedly arranged. In particular, the bearing pin is arranged in a through opening of the pin support.

For example, the pin support is arranged between two side parts by means of which the holding unit is attachable or attached to a crossmember and is fixedly connected to said side parts, or in other embodiments the side parts themselves form the pin support.

No further details have been provided previously in respect of a fixing of an inserted insertion portion of a ball neck in the ball neck receptacle of the ball neck receiving body.

Different solutions can be provided in order to fix the insertion portion.

In particular, the ball neck receptacle has one or more lateral transverse walls, which preferably is/are formed at least in part in a planar manner and by means of which the insertion portion is fixed in particular non-rotatably in the ball neck receptacle.

In particular, the ball neck receiving body has a fixing device for fixing the insertion portion at least in the insertion direction, wherein this fixing device is formed for example by through openings in the ball neck receiving body and by a fixing pin as well as by a corresponding through opening in the insertion portion, and the fixing is achieved by arranging the fixing pin in the through openings.

No further details have been provided previously in respect of a fixing of the ball neck receiving body and an insertion portion of a ball neck received in the ball neck receptacle of said ball neck receiving body.

A very wide range of different solutions can be provided for this purpose.

At least one stop element is preferably provided, by means of which, in cooperation with an insertion portion of a ball neck inserted into the ball neck receptacle, the ball neck receiving body together with the insertion portion is fixed non-rotatably in at least one pivot direction about the pivot axis. Here, the at least one stop element or the plurality of stop elements are in particular constructed to be stable enough to sufficiently firmly fix the insertion portion of the ball neck non-rotatably together with the ball neck receiving body for trailer operation.

It is particularly expedient if the at least one stop element is fixedly connected to the holding unit, for example by means of a stop support.

In particular, at least in one operating state, the at least one stop element is arranged on a side of the pivot axis facing the rear-end side of the motor vehicle.

In particular, a stop element is provided for each of the two opposite directions of rotation about the pivot axis.

In particular, a stop element which blocks a pivot movement about the pivot axis from the working position in the direction towards the rest position cooperates with the insertion portion in the ball neck receptacle so that, in particular when the insertion portion is inserted, the pivoting of the ball neck receiving body together with the insertion portion is blocked, but pivoting of the ball neck receiving body in the direction towards the rest position is released when the insertion portion is removed. It is preferably provided that at least one stop element, in particular the one that blocks a pivot movement from the working position in the direction towards the rest position, engages through an opening of the ball neck receiving body at least in the working position. For example, cooperation between the stop element and the inserted insertion portion is hereby made possible in a structurally simple way.

It is particularly expedient if at least one stop element, in particular the one that blocks a pivot movement from the working position in the direction towards the rest position, forms a support surface, against which an insertion portion of a ball neck inserted into the ball neck receptacle abuts in the working position of the ball neck receiving body, thus blocking a pivoting of the ball neck receiving body together with the inserted insertion portion in at least one pivot direction, in particular in the pivot direction towards the rest position. In particular, the support surface is arranged here substantially in the through opening of the ball neck receiving body.

It is particularly advantageous if the support surface in the working position forms at least a portion of an inner transverse wall surface of the ball neck receptacle, for example in the region of the through opening of the ball neck receiving body, and thus there is blocked a pivoting of the inserted insertion portion together with the ball neck receiving body.

In particular, the support surface in the working position runs at least approximately parallel to the center axis of the ball neck receiving body.

For example, the support surface in at least one operating state in the working position runs at least approximately parallel to the road surface.

In particular, the support surface runs at least approximately parallel to the pivot axis and in particular at least in one operating state approximately perpendicularly to a vertical through the pivot axis.

The support surface at least in one operating state is preferably arranged on a side of the vertical through the pivot axis facing the rear-end side of a motor vehicle.

It is particularly advantageous if the at least one stop element in the rest position engages in the ball neck receptacle, whereby a space-saving construction is advantageously made possible. In particular, in this case, the stop support engages through the opening in the ball neck receiving body.

In particular, it is provided that the trailer devices constructed in such a way that the support surface of the at least one stop element in the rest position runs at least approximately perpendicularly to the center axis of the ball neck receptacle.

A pivot stop is preferably fixedly arranged on the ball neck receiving body and, together with an end stop arranged fixedly on the holding unit, in the working position counteracts a pivoting of the ball neck receiving body from the working position in a pivot direction opposite the direction towards the rest position and blocks this rotary movement.

In particular, the holding unit has a stop element which forms the end stop.

For example, this stop element is a further stop element of the holding unit.

It is particularly preferable, however, if the at least one stop element, which together with the inserted insertion portion locks a pivoting in the direction towards the rest position, also forms the end stop.

In particular, the end stop is arranged here on a side of the stop element opposite the support surface.

In some embodiments, the stop element forming the end stop is arranged laterally on the holding unit, based on the pivot axis.

In preferred embodiments, the stop element forming the end stop is arranged in at least one operating state on the holding unit on a side of the pivot axis facing the rear-end side of the motor vehicle.

In particular, the stop support is arranged between the pivot axis and the pivot stop.

In particular, a side of the stop support facing the pivot stop is constructed in such a way that, as the ball neck receiving body is pivoted from the rest position into the working position and vice versa, the pivot stop is entrained unhindered along this side by the ball neck receiving body.

No further specific details have been provided previously in respect of the drive.

For example, the drive could be a linear drive, the linear movement of which is converted into a rotary movement.

It is particularly preferred if the drive is a rotary drive.

In this case, a drive rotation axis, about which the drive effects a rotary movement, preferably runs at least approximately parallel to the pivot axis about which the ball neck receiving body is pivotable between the rest position and the working position, so that in particular the rotary movement effected by the drive can be transferred to the ball neck receiving body in a structurally simple way.

It is particularly expedient if the drive rotation axis of the drive coincides at least approximately with the pivot axis about which the ball neck receiving body is pivotable between the rest position and the working position.

No further details have been provided previously in respect of further advantageous embodiments of the trailer device.

The problem forming the basis of the invention is also solved alternatively or in addition in that the trailer device comprises a sensor which is constructed to detect whether a ball neck is inserted by means of its insertion portion in the ball neck receptacle of the ball neck receiving body positioned in the working position at least over a minimal extent necessary to fix the ball neck in the ball neck receptacle. Therefore, the sensor can thus expediently detect whether the insertion portion is received in the ball neck receptacle at least over the necessary minimal extent, and for example it is possible to display to the user that he has inserted the insertion portion sufficiently far.

In particular, it is provided that the at least one insertion portion inserted over the minimal extent at least contributes to a blocking of the pivoting of the ball neck receiving body from the working position in at least one pivot direction, in particular at least in the direction towards the rest position.

The insertion portion inserted at least over the minimal extent preferably cooperates with the at least one stop element to fix the ball neck receiving body non-rotatably.

It is particularly advantageous if the insertion portion inserted at least over the minimal extent contacts the support surface of the at least one stop element at least partially, for example over the entire area.

It is particularly expedient if the insertion portion inserted at least over the minimal extent is inserted far enough for fixing in at least one insertion device by means of the fixing device.

For example, the through opening in the insertion portion inserted over the minimal extent is at least arranged aligned with the corresponding through openings in the ball neck receiving body to such an extent that a fixing pin for fixing can be inserted through said openings.

It is particularly advantageous if the sensor is arranged behind the at least one stop element, based on the direction of insertion of the insertion portion into the ball neck receptacle. In particular, the sensor hereby detects whether the insertion portion is inserted in the ball neck receptacle at least beyond the stop element and in particular whether the inserted insertion portion thus reliably cooperates with the stop element so as to block a pivoting of the ball neck receiving body.

For example, the sensor is an optical sensor.

In other advantageous embodiments, the sensor is a magnetic, in particular inductive sensor.

In some expedient embodiments, the sensor is constructed as a contact sensor.

No further details have been provided previously in respect of further configurations of the trailer device.

For example, the holding unit is intended to be attached to a crossmember.

In preferred embodiments, the trailer device also comprises the crossmember.

Particularly expedient embodiments of a trailer device with a ball neck receiving body which can be pivoted between a working position and a rest position about in particular precisely one pivot axis and which can be fixed in the working position are the subject of publication DE 10 2016 107 302 A1, and reference is made to the full content of this document in particular with regard to preferred embodiments of the pivot bearing unit, the positioning of the ball neck receiving body in the rest position and working position, and the construction of the ball neck receiving body and also of the holding unit and further advantageous constructions of the trailer device.

Alternatively or additionally, the above-stated problem addressed is also solved by a motor vehicle which has a trailer device having at least one of the above-explained features or a plurality of the above-explained features in combination. The above-stated advantages can be transferred accordingly to the motor vehicle.

In the foregoing and hereinafter, the expression "at least approximately" shall be understood in conjunction with a specification in particular to mean that there are included deviations from the specification that are technically determined and/or technically irrelevant. For example, deviations by up to ±20%, in particular of ±10%, for example of ±5% from the detail are also included. In the case of directional details, for example deviations by up to 20°, in particular of up to 10°, for example of up to 5° are also included by the wording "at least approximately".

The above description of solutions according to the invention therefore in particular comprises the various combinations of features defined by the consecutively numbered embodiments below:

Further features and advantages of preferred embodiments of the invention are the subject of the following explanation of an embodiment example and the schematic representation thereof.

BRIEF DESCRIPTION OF THE DRAWINGS

In the drawing:

FIG. 2 shows a perspective representation of the trailer device in a working position;

FIG. 3a shows a perspective representation and partial exploded representation of the trailer device;

FIG. 3b shows an enlarged representation of a detail of FIG. 3a in the region of a coupling unit between a ball neck receiving body of the trailer device and a drive thereof;

FIG. 15 shows a sectional representation according to the section A-A shown in FIG. 14 and a section D-D shown in this Figure;

FIG. 17 shows a sectional representation according to the section C-C shown in FIG. 16.

DETAILED DESCRIPTION OF THE INVENTION

Figure 1:
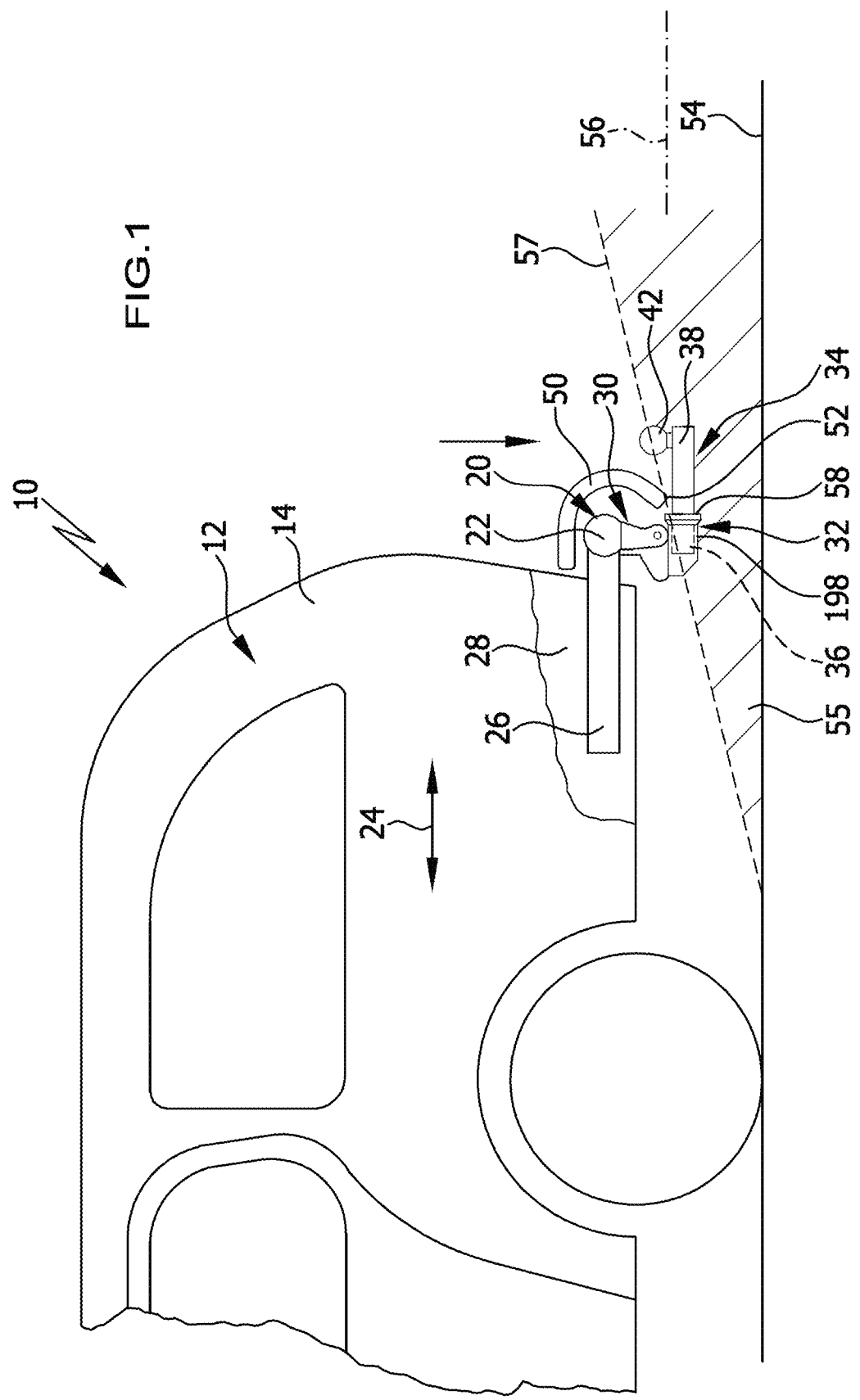
FIG. 1 shows a schematic view of a rear-end region of a motor vehicle with a trailer device mounted thereon.

A motor vehicle shown by way of example in FIG. 1 and denoted as a whole by 20 comprises a vehicle body 12, on which a trailer device 10 according to the invention is mounted in a rear-end region 14.

The trailer device 20, which is shown by way of example in FIGS. 2 to 7 in a working position, comprises a crossmember 22, which extends transversely to a longitudinal direction 24 of the vehicle and is connected to the rear-end region 14 of the vehicle body 12 for example by means of side members 26 extending parallel to the longitudinal direction 24 of the vehicle and arranged on body portions 28 extending likewise in the longitudinal direction 24 of the vehicle.

A holding unit denoted as a whole by 30 is provided on the crossmember 22 and supports a ball neck receiving body denoted as a whole by 32, the ball neck receiving body 32 being arranged pivotably on the holding unit.

As is shown by way of example in FIGS. 8 to 12, a ball neck denoted as a whole by 34 is insertable by means of an insertion portion 36, which forms an end of the ball neck 34, into said ball neck receiving body 32, whereas another, opposite end 38 of the ball neck 34 protruding beyond the ball neck receiving body 32 supports a coupling ball 42.

In the motor vehicle 10 according to the invention, the crossmember 22, the end portions of the side members 26 for example holding the crossmember 22, and the holding unit 30 are preferably covered by a bumper unit 50 of the body, which passes over the crossmember 22 on an upper side furthest away from the road surface 54 and on a rear side furthest away from the rear-end region 14 of the body 12 and likewise passes over the holding unit 30 on its upper side furthest away from the road surface 54 and on its side furthest away from the rear-end region 14, so that, when viewing the vehicle body 12 from the rear, only the ball neck receiving body 32 below a lower edge 52 of the bumper unit 50 and below a geometric lower-edge plane 56 running parallel to the road surface 54 and through the lower edge 52 lies in a field of view 55 in the working position of the ball neck receiving body, so that, in the working position, an insertion opening 62 at an end face 58 of the ball neck receiving body 32 is visible and is preferably surrounded by a reinforcement collar 64 of the ball neck receiving body 32.

The field of view 55 is delimited here by a viewing line 57 inclined by at least approximately 15° relative to the road surface 54 and touching the lower edge 52 of the bumper unit 50 and lies below said line.

Starting from the insertion opening 62, a ball neck receptacle 66 extends into the ball neck receiving body 32 preferably having a sleeve-like basic shape, the ball neck receptacle 66 preferably having a rectangular, in particular a square cross-sectional shape.

In the working position of the ball neck receptacle 66, a center axis 68 of the ball neck receptacle 66 preferably runs at least approximately parallel to the direction of travel 24 and also at least approximately horizontally when the motor vehicle 10 is positioned on a horizontal road surface 54.

The ball neck receiving body 32 has, in particular, mutually opposing side walls 72 and 74 and also transverse walls 76 and 78 connecting the side walls, wherein in particular the side walls 72 and 74 and the transverse wall 76 and 78 in each case run parallel to the center axis 68.

At a spacing from the insertion opening 62, the ball neck receiving body 32 is provided in the region of the mutually opposing side walls 72 and 74 with openings 73, through which a fixing pin 75 (shown by way of example in FIGS. 8, 10 and 11) can be inserted in order to pass through an opening 77 in the insertion portion 36 of the ball neck 34 inserted into the ball neck receptacle 66 and fix said ball neck relative to the ball neck receiving body 32, so that the ball neck is fixed in the ball neck receptacle 66 so as to be at least substantially immobile in respect of movements in a direction parallel to the center axis 68.

In addition, the insertion portion 36 is likewise fixed in the ball neck receptacle 66 against a rotary movement about the center axis 68, in particular in that the ball neck receptacle 66 has an at least approximately rectangular cross-sectional shape, and in addition is also fixed against movements transverse to the center axis 68 in that the insertion portion 36 of the ball neck 34 is guided only with little play in the ball neck receptacle 66 by the side walls 72 and 74 and the transverse walls 76 and 78.

The ball neck receiving body 32 is preferably constructed such that the ball neck receptacle 66, starting from the insertion opening 62, extends fully through said opening, more specifically for example as far as a rear-side opening 79 of the ball neck receiving body 32 opposite the insertion opening 62.

As can be seen for example from FIG. 1, the ball neck receiving body 32 arranged on the motor vehicle 10 by means of the holding unit 32 and the crossmember 22 lies above the road surface 54 and is positioned at a spacing from the road surface 54 such that said body is positioned for example close to a geometric lower-edge plane 56 running through the lower edge 52 of the bumper unit 50 and extending approximately parallel to the road surface 54, more specifically below said plane, for example at most at a spacing from said plane corresponding to a maximum extent of the ball neck receiving body 32 perpendicularly to the center axis 68.

The ball neck 34 is thus easily insertable into the easily accessible insertion opening 62 of the ball neck receptacle 66, and the ball neck receiving body 32 is also accessible in such a way that the fixing pin 75 can be inserted through the openings 73 and 77 with good accessibility.

The holding unit 30 comprises in particular two side parts 82 and 84, which are connected to the crossmember 22 and extend starting from the crossmember 22 in the direction towards the ball neck receiving body 32, and a pivot bearing unit, denoted as a whole by 110, on which the ball neck receiving body 32 is arranged mounted so as to be pivotable about a pivot axis 112 at least between the working position and a rest position.

To this end, the ball neck receiving body 32, in particular the side walls 72, 74 thereof, is connected for example to bearing elements 92 and 94, which are pivotable relative to a bearing pin 96 of the pivot bearing unit 110. For example, the bearing pin 96 passes through a bearing opening 102 of a pin carrier 98 of the holding unit 30 and through openings 106 and 108 in the bearing elements 92 and 94 respectively.

In particular, the pin carrier 98 is arranged between the side parts 82, 84 and fixedly connected thereto. In variants, the side parts 82, 84 form the pin carrier 98 and have the through openings forming the bearing through opening 102.

In this case, the bearing pin 96 is either mounted rotatably in the bearing through opening 102 or passes through the bearing opening 102 and is arranged non-rotatably on the holding unit, and the bearing elements 92 and 94 are mounted rotatably relative to the bearing pin 96 with the through openings 106 and 108.

In variants, the bearing pin 96 is fixedly connected to the bearing element 92, 94 and is mounted in the bearing through opening 102 rotatably relative to the pin carrier 98.

In another expedient variant, for reasons of simplicity, the bearing pin 96 is arranged rotatably relative both to the bearing elements 92 and 94 and to the pin carrier 98.

The pivot axis 112 is defined here by a center axis of the bearing pin 96.

For example, the pivot axis 112 is the only pivot axis about which the ball neck receiving body 32 is pivotable relative to the holding unit 30.

Furthermore, in particular the pivot axis 112 runs at least approximately parallel to a longitudinal extent of the crossmember 22.

In the working position, as shown for example in FIGS. 2, 3 and 8 to 11, the ball neck receiving body 32 is arranged at least with its central region 118 comprising the through openings 73 beneath the side parts 82, 84 of the holding unit 30, as viewed in the direction of the force of gravity, and beneath the geometric lower-edge plane 56.

In particular, the ball neck receiving body 32 is arranged pivotably on the holding unit 30 arranged on the motor vehicle 10, in such a way that, with free pivotability of the ball neck receiving body, it is moved at least approximately into the working position as a result of the effect of the force of gravity, that is to say in particular the center of gravity of the ball neck receiving body 32, in the working position, lies beneath the pivot axis 112, based on the direction of the force of gravity.

Figure 10:
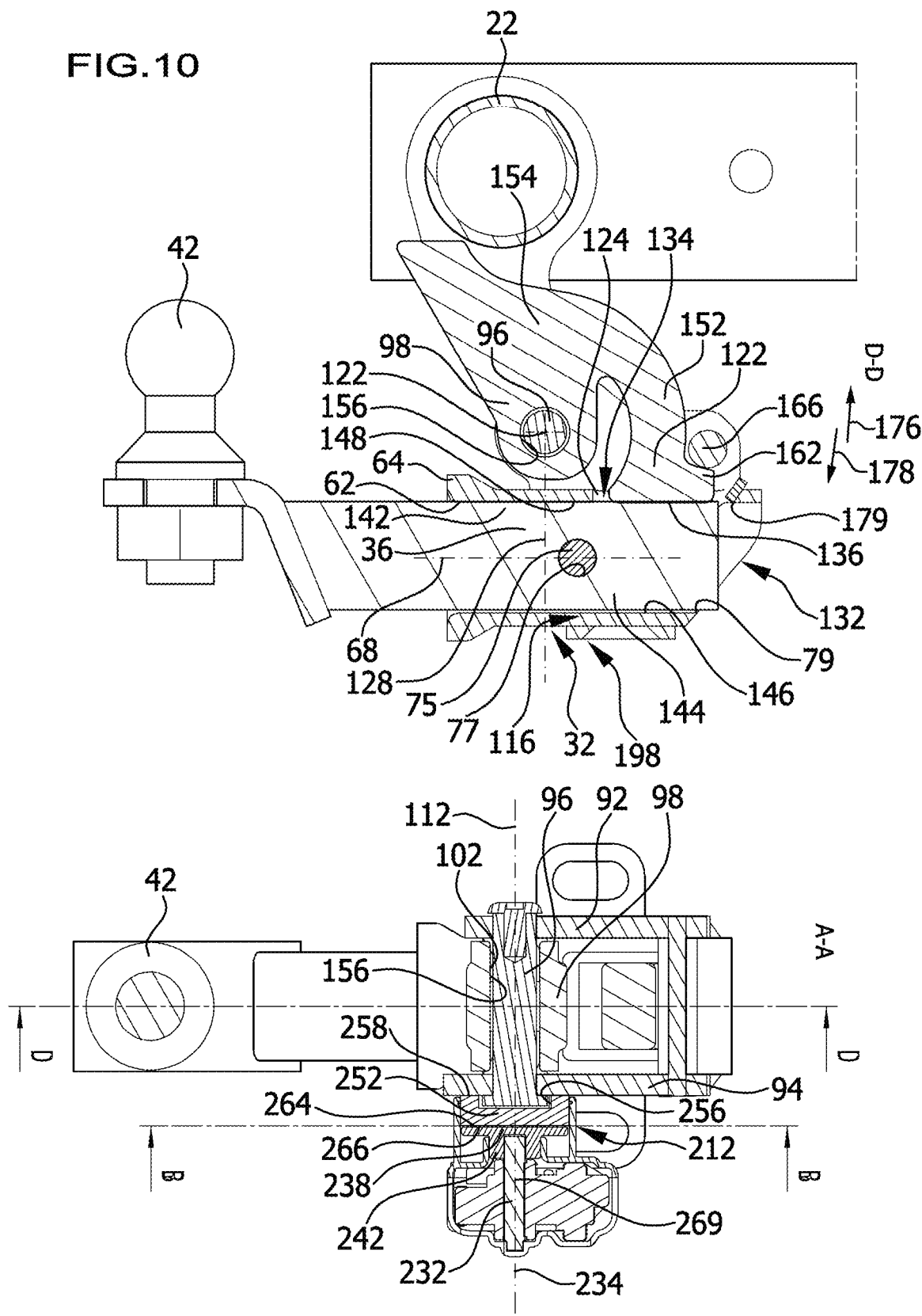
FIG. 10 shows a sectional representation according to the section A-A shown in FIG. 9 and the shown section D-D.
Figure 11:
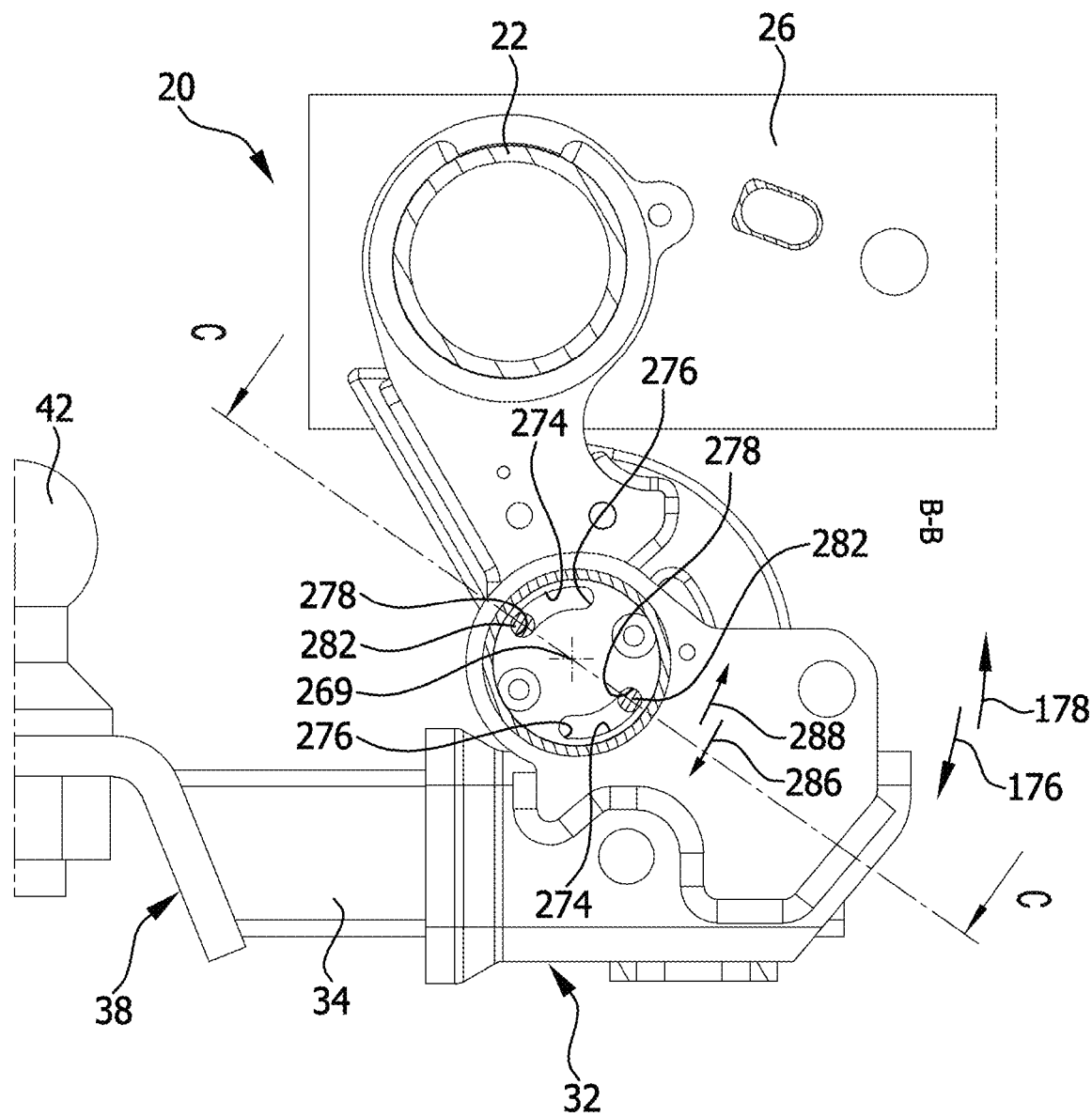
FIG. 11 shows a sectional representation according to the section B-B shown in FIG. 10.
Figure 12:
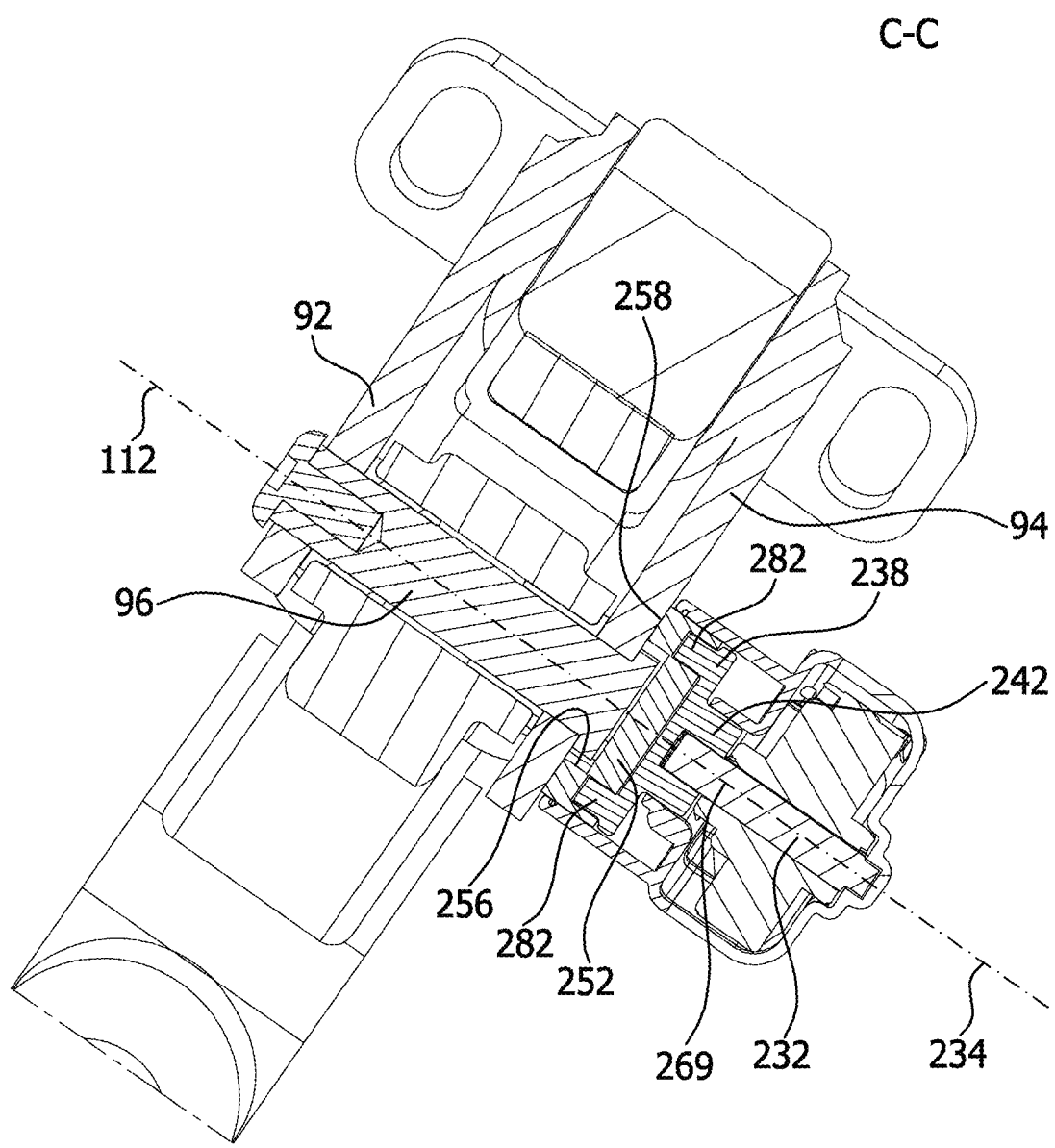
FIG. 12 shows a sectional representation according to the section C-C shown in FIG. 11.

In order to fix the ball neck receiving body 32 in the working position, as is shown in particular in FIG. 10, a stop element 122 is provided, which passes through an opening 124 of the ball neck receiving body 32. The through opening 124 is provided on a side 134 of the ball neck receiving body 32 facing the pivot axis 112 and lives in a stop region 126, which extends between the central region 118 and a rear-side end 132 of the ball neck receiving body 32 remote from the insertion opening 62. In particular, the stop region 126 of the ball neck receiving body 32, in the working position, lies between a vertical 128 through the pivot axis 112 and the rear-side end 132 of the ball neck receiving body 32 remote from the insertion opening 62.

In particular, the through opening 124 lies on a side of the ball neck receiving body 32 closest to the pivot bearing unit 110, preferably in the transverse wall 78 extending at least in part approximately parallel to the pivot axis 112.

The stop element 122 forms a support surface 136 for the insertion portion 35, which support surface faces the ball neck receptacle 66.

Figure 4:
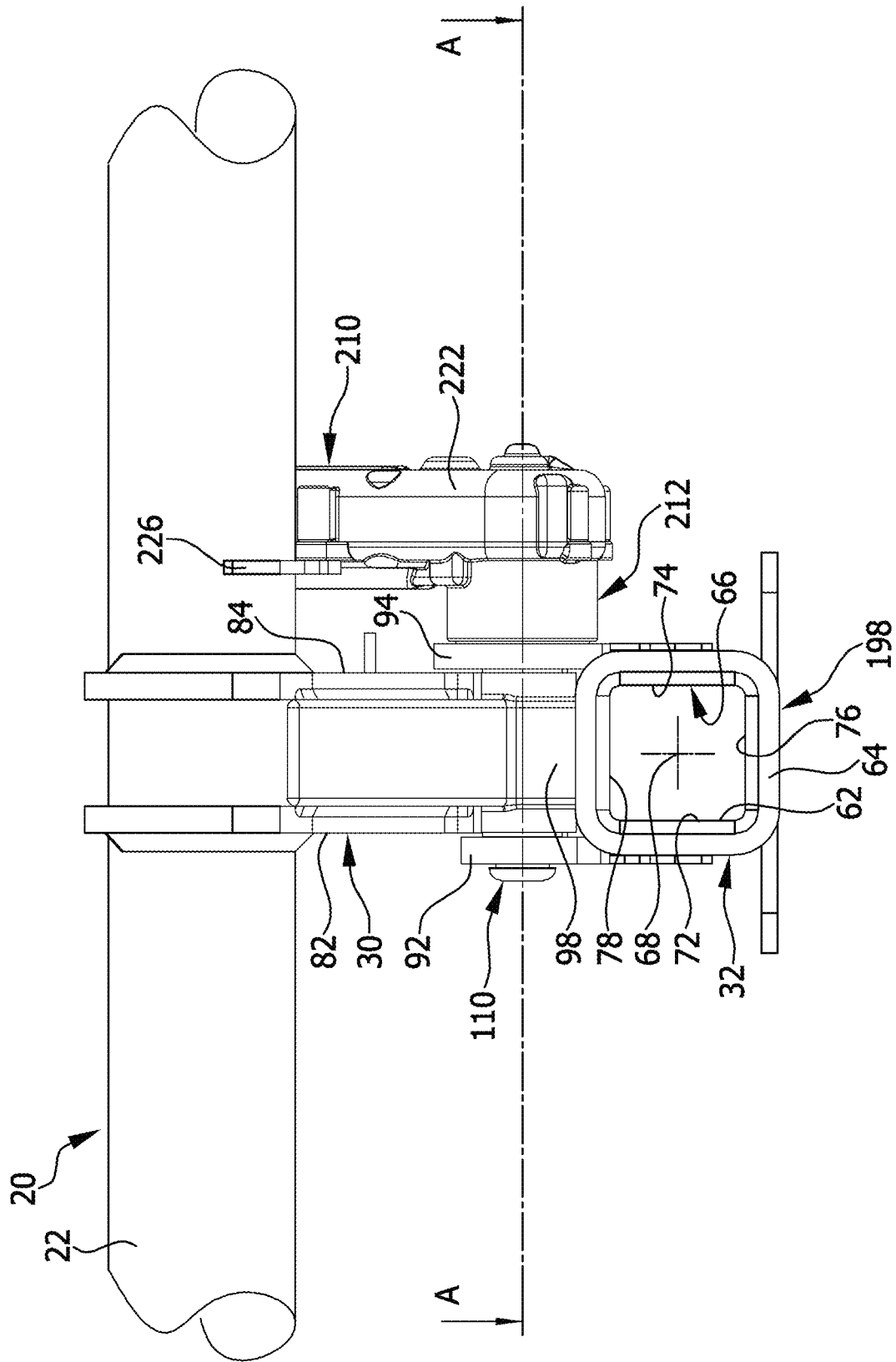
FIG. 4 shows a substantially horizontal view of the trailer device, wherein the ball neck receiving body is in the working position.
Figure 5:
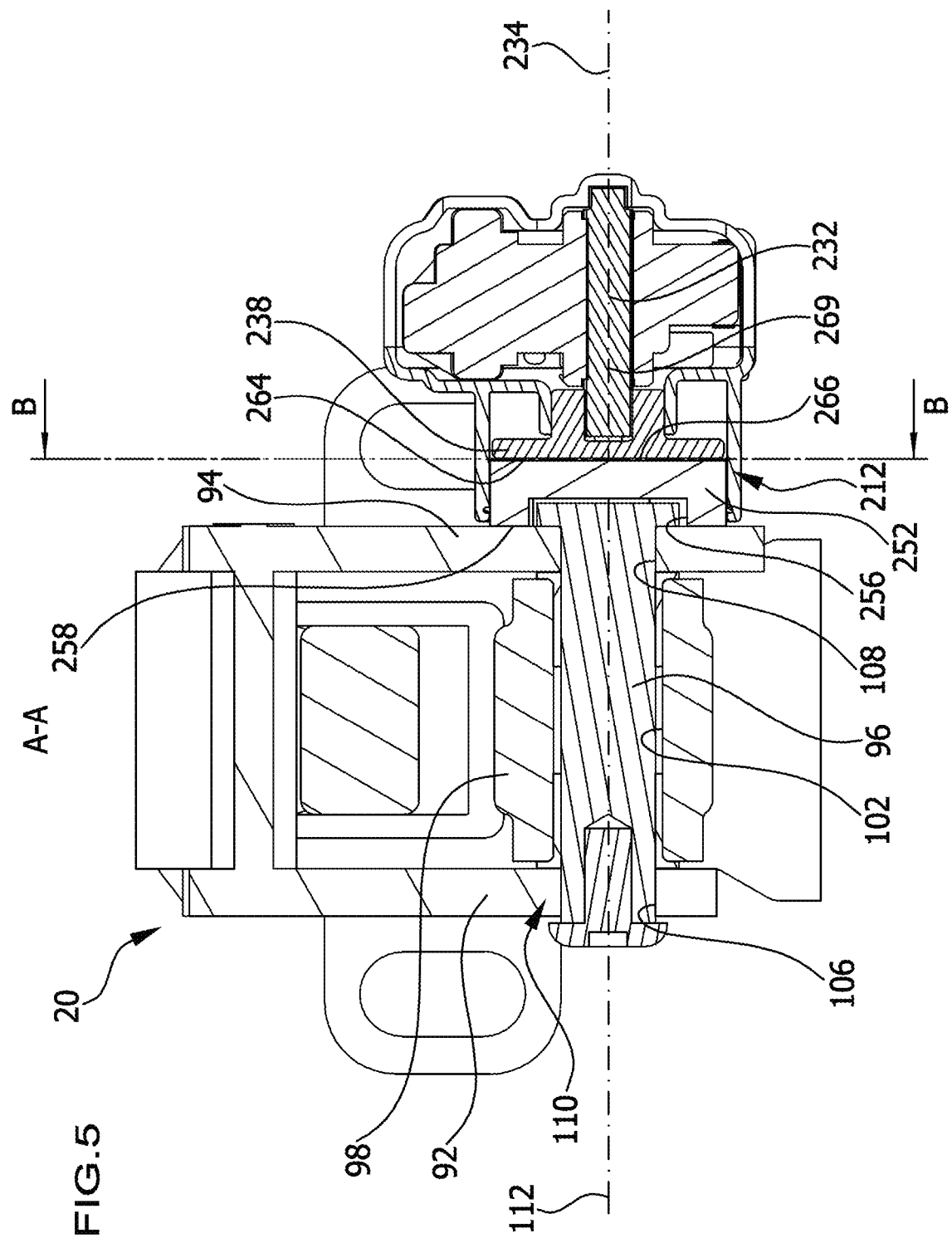
FIG. 5 shows a sectional representation according to the section A-A shown in FIG. 4.
Figure 6:
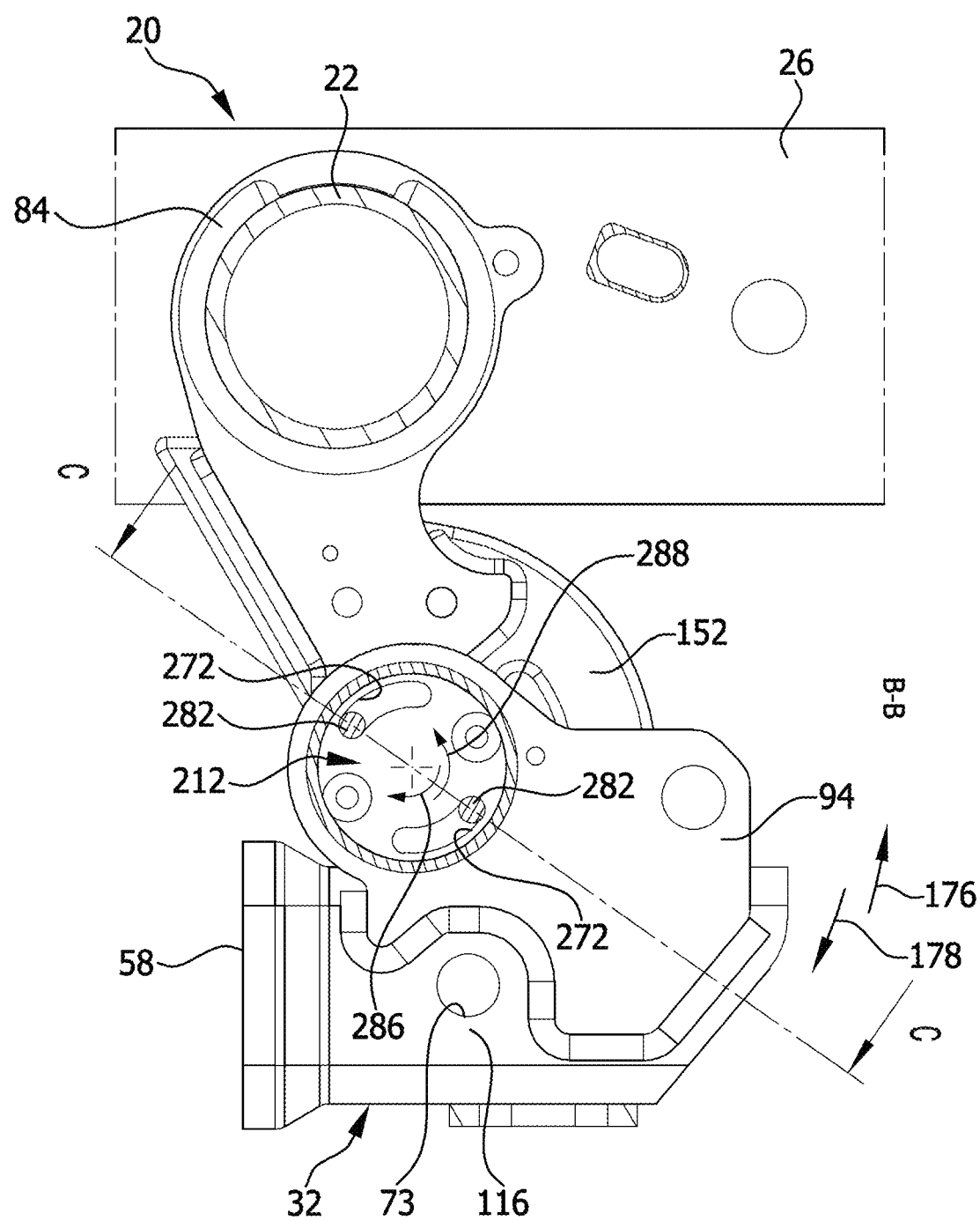
FIG. 6 shows a sectional representation according to the section B-B shown in FIG. 5.
Figure 7:
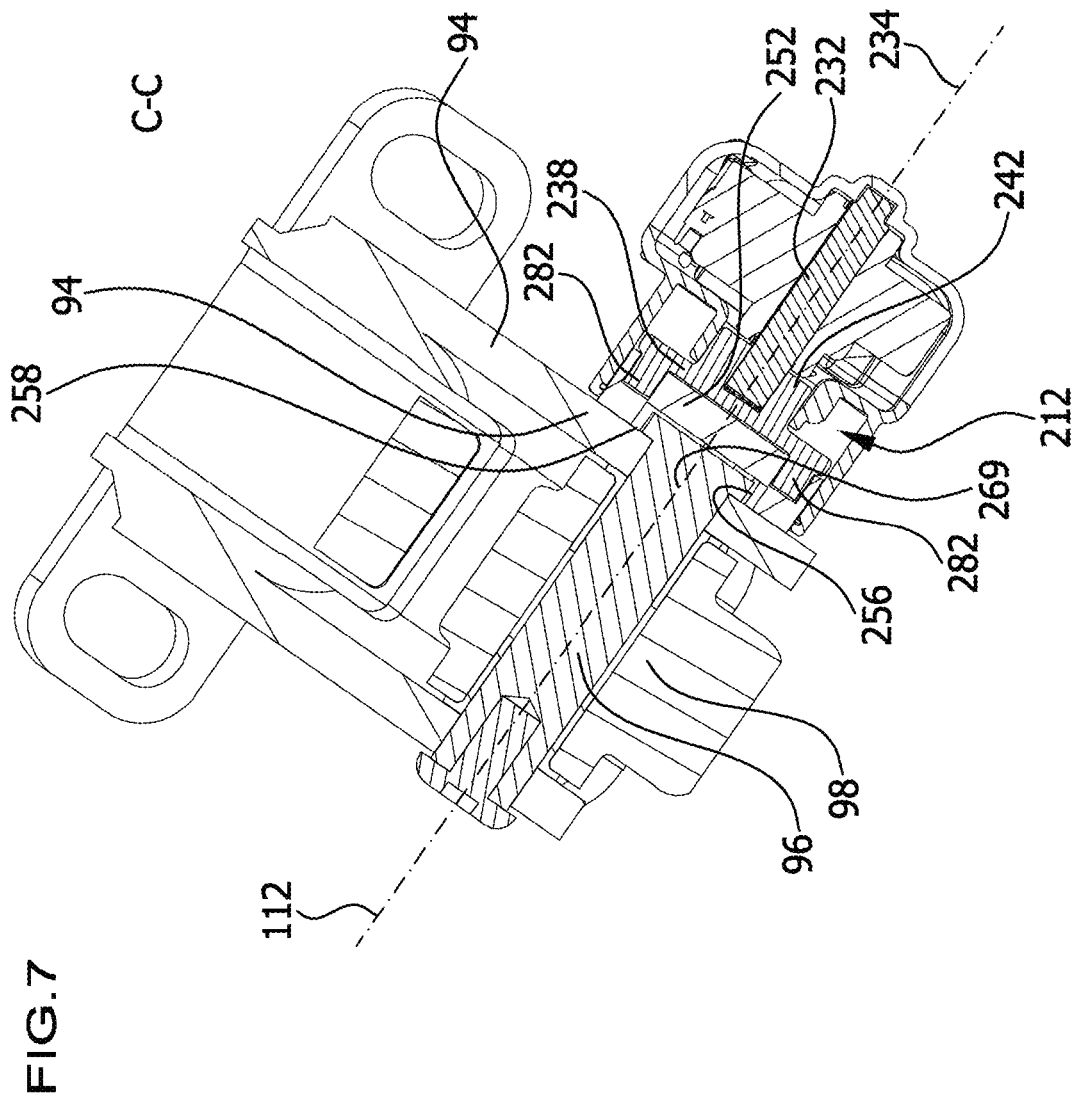
FIG. 7 shows a sectional representation according to the section C-C shown in FIG. 6.
Figure 8:
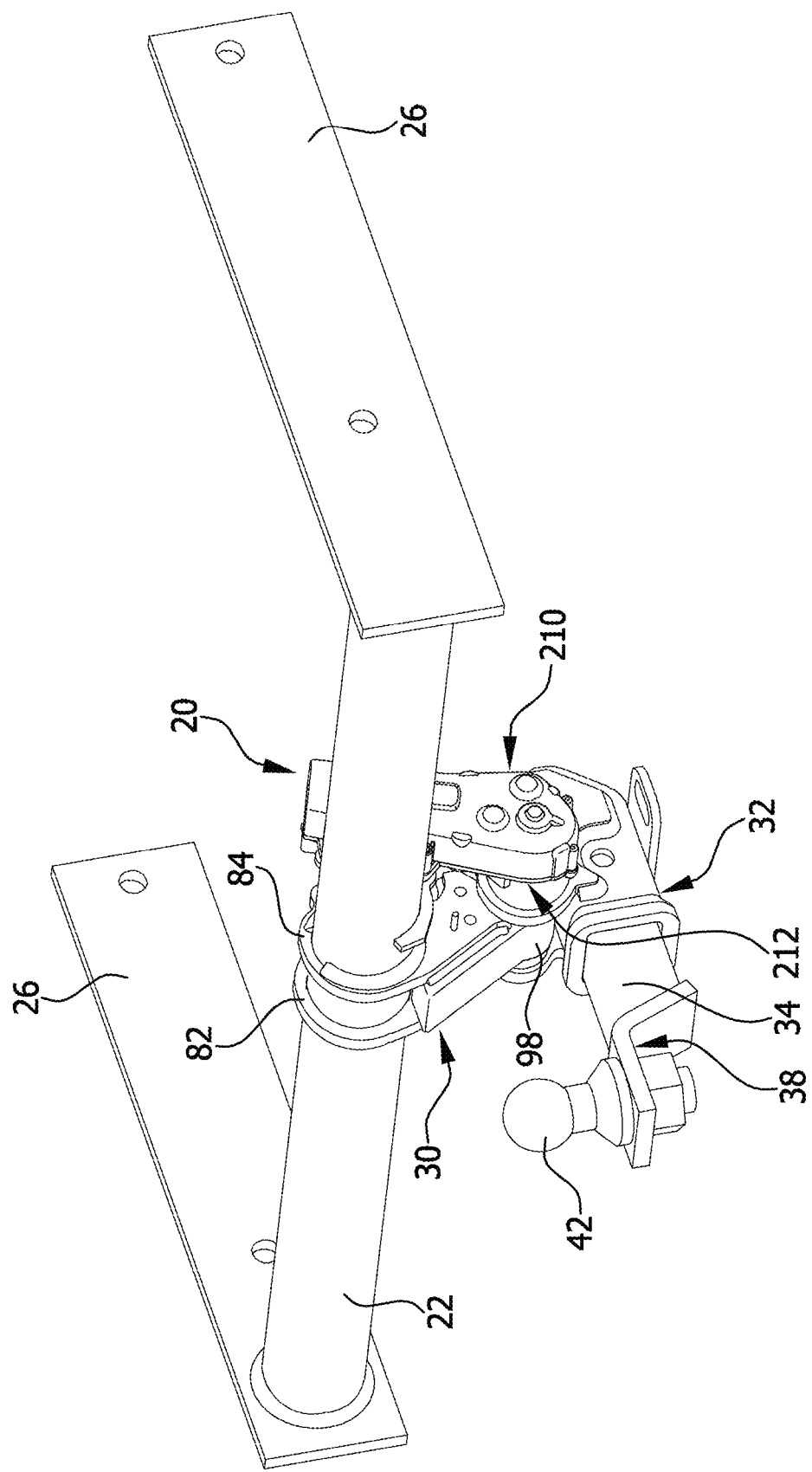
FIG. 8 shows a perspective view of the trailer device with a ball neck inserted into the ball neck receptacle.

Since the stop element 122 in the working position engages through the opening 124, in the working position the support surface 136 forms, as shown by way of example in FIG. 4, a region of an upper inner transverse wall surface 148, which runs in particular parallel to the center axis 68 of the ball neck receptacle 66 and at least in part parallel to the pivot axis 112, delimits the ball neck receptacle 66, and is also formed in part by the transverse wall 78.

A received insertion portion 36 is supported on its side 142 facing the pivot axis 112 against the upper inner transverse wall surface 148 and by means of a side 144 which is opposite the side 142, faces away from the pivot axis 112 and for example faces the road surface 54 against a lower inner transverse wall surface 146 of the transverse wall 76 delimiting the ball neck receptacle 66, wherein in particular the lower inner transverse wall surface 148 likewise runs parallel to the center axis 68 and at least in part parallel to the pivot axis 112.

In order to fix the stop element 122 relative to the holding unit 30, the stop element 122 is held by a stop support 152, which extends from the stop element 122 to a support carrier 154, which for example is arranged between the side parts 82 and 84, and the support carrier 154 is fixedly connected to the crossmember 22.

In particular, the support carrier 154 has a through opening 156, which forms the bearing through opening 102 and is passed through by the bearing pin 96. For example, the support carrier 154 is a forged part connected laterally fixedly to the side parts 82, 84.

The stop support 152 preferably extends by means of the stop element 122 arranged at its end on a side furthest away from the bumper unit 50 and thus the side of the holding unit 30 closest to the rear-end region 14 and arranged in the direction of forward travel.

In addition, the stop support 152 also has an end stop 162, which in the working position cooperates with a pivot stop 166 connected to the ball neck receiving body 32 to limit a pivot movement of the ball neck receiving body 32 about the pivot axis 112 and to fix said body in the working position.

In this case, in the region of the stop region 126, the pivot stop 166 is spaced slightly from the side 134 of the ball neck receiving body 32 substantially facing the pivot axis 112, between the bearing elements 92, 94, and is arranged fixedly connected to said bearing elements, and the end stop 162, which in particular is constructed as part of the stop element 122, lies in the working position between the pivot stop 166 and the ball neck receiving body 32, in particular in the region of the through opening 156.

The end stop 162, together with the pivot stop 166, therefore prevents the ball neck receiving body 32, coming from the rest position, from being pivoted in a pivot direction 178 beyond the working position, since in the working position the end stop 162 and the pivot stop 166 bear against one another and block a pivoting in the pivot direction 178.

In addition, in the event that an insertion portion 36 is inserted sufficiently far into the ball neck receptacle 66, pivoting of the ball neck receiving body 32 in the working position in a pivot direction 176 opposite the pivot direction 178 and oriented from the working position into the rest position is prevented in that the insertion portion 36 bears against the support surface 136 of the stop element 122 and thus prevents the unit formed of the ball neck receiving body 32 and insertion portion 36 from being pivotable in the pivot direction 176, since these prevent the end 132 of the ball neck receiving body 32 opposite the insertion opening 62 from moving together with the insertion portion 36 in the direction towards the support carrier 154.

The unit formed of the ball neck receiving body 32 and ball neck 34, when the insertion portion 36 is inserted sufficiently far, in the working position is thus fixed non-rotatably with reference to the pivot axis 112, since on the one hand the end stop 162 and the pivot stop 166 and on the other hand the insertion portion 36 fixed in the ball neck receptacle 66 together with the stop element 122 prevent said unit from pivoting in the pivot directions 178 and 176.

In the case that the insertion portion 36 is fixed by the inserted fixing pin 75, the ball neck 34 is therefore fixed in the ball neck receptacle 66 both in relation to the pivot directions 176 and 178 and non-rotatably about the center axis 68 and linearly parallel and transverse thereto in such a stable manner that this fixing is able to withstand the operating loads during trailer operation.

In expedient variants of the embodiment, a sensor 179 shown by way of example and schematically in FIG. 10 is provided in the stop region 126 and can be used to detect whether the insertion portion 36 is inserted in the ball neck receptacle 66 over a minimal extent sufficient to fix the unit formed of the ball neck receiving body 32 and ball neck 34 non-rotatably about the pivot axis 112, i.e. in particular whether the insertion portion 36 bears at least in part against the support surface 136. In particular, in the case that the insertion portion 36 is inserted over the minimal extent, the through openings 73 of the ball neck receiving body 32 and the through opening 77 of the ball neck 34 are oriented in alignment with one another at least to such an extent that the fixing pin 75 is insertable into said through openings and thus the insertion portion 36 can be fixed in the ball neck receptacle 66 in the insertion direction, and therefore the sensor 179 also detects whether the insertion portion 36 is inserted far enough for fixing in the insertion direction.

Figure 13:
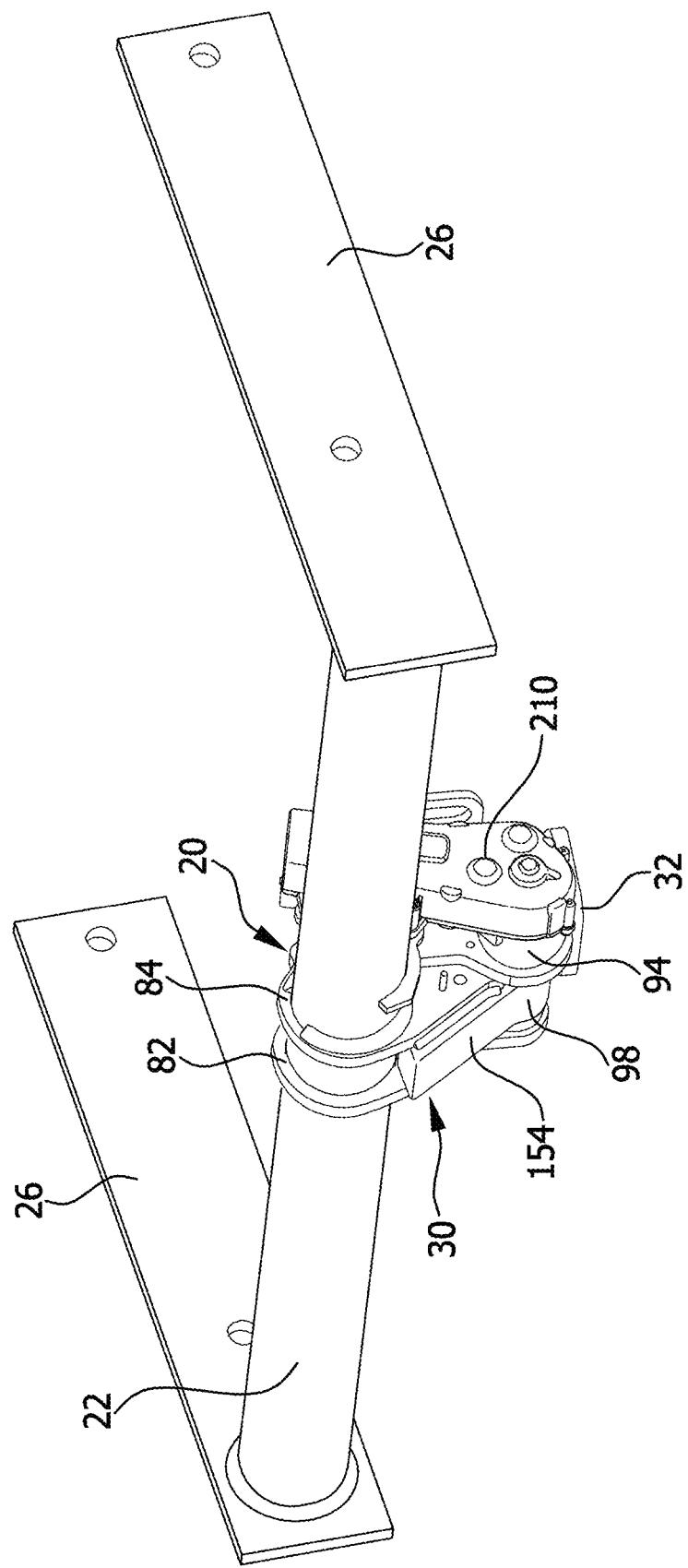
FIG. 13 shows a perspective representation of the trailer device, wherein the ball neck receiving body is in a rest position.
Figure 14:
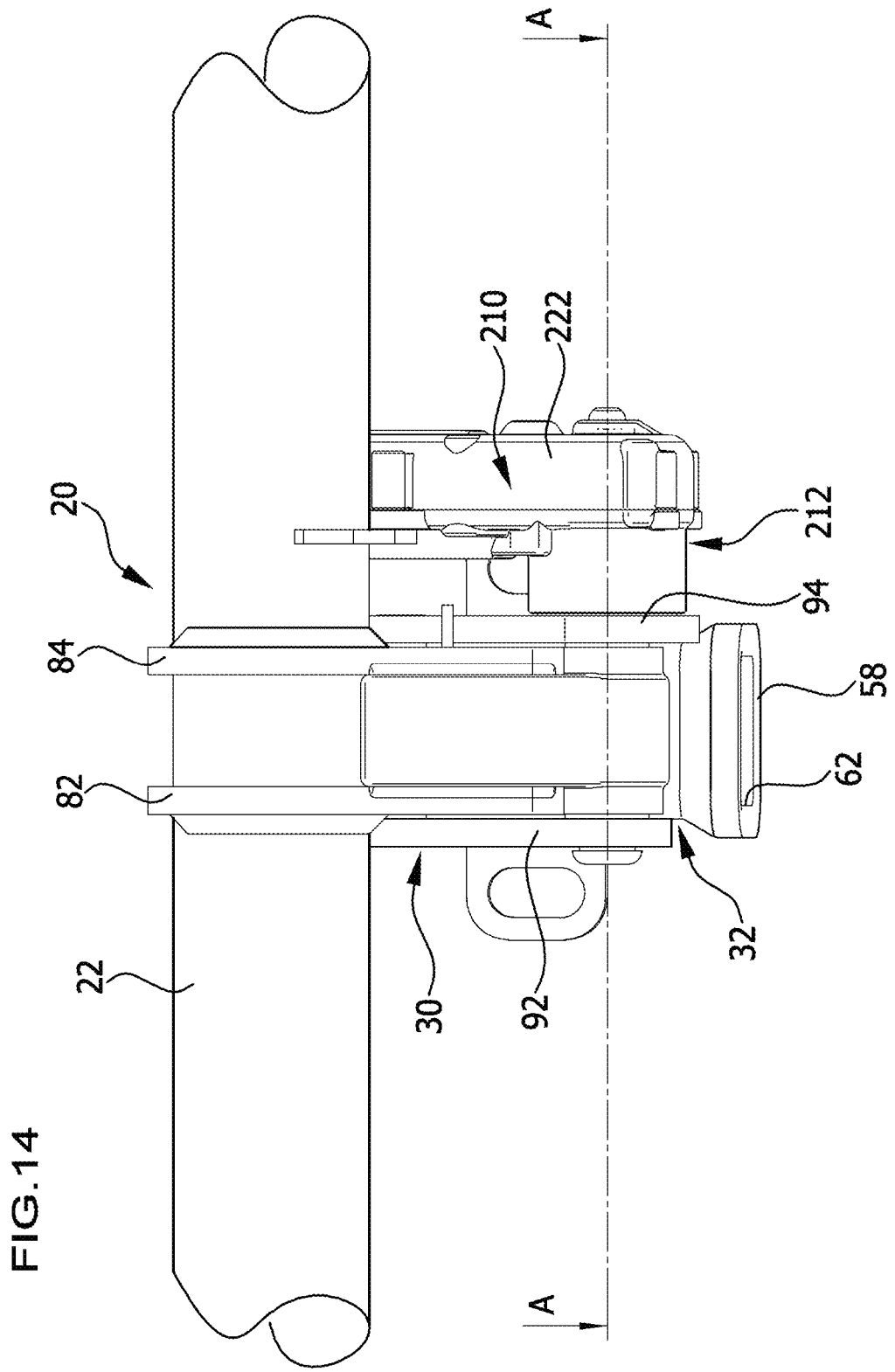
FIG. 14 shows a representation similar to FIG. 4, wherein the ball neck receiving body is positioned in the rest position.

If, however, the insertion portion 36 of the ball neck 34 is removed from the ball neck receptacle 66, in the working position the above-described blocking of the pivot movement of the ball neck receiving body 32 in the pivot direction 176 oriented towards the rest position is removed, and it is possible, as shown by way of example in FIGS. 13 and 17, to pivot the ball neck receiving body 32 from the working position into the rest position, wherein the end 132 of the ball neck receiving body 32 opposite the insertion opening 62 moves in the direction towards the support carrier 154.

During this pivot movement of the ball neck receiving body 32 in the pivot direction 176, the stop element 122 passes together with the stop support 152 through the opening 124 in the ball neck receptacle 66 of the ball neck receiving body 32, such that, as shown in FIG. 15, in the rest position the stop element 122 with the stop support 152 lies within the ball neck receptacle 66, without blocking the pivoting of the ball neck receiving body 32 in the pivot direction 176 into the rest position.

To this end, the stop support 152 is preferably constructed so that it extends arcuately away from the support carrier 154 as far as the stop element 122 and the stop element 122 has an extent, at least approximately perpendicularly to the center axis 68 of the ball neck receptacle 66, that is preferably smaller than, but for example at least half the size of the extent of the ball neck receptacle 66 at least approximately perpendicularly to its center axis 68 and transversely to the pivot axis 112, as shown in FIG. 15.

In addition, a side of the stop support 152, in particular facing away from the pivot axis 112, is at least approximately arc-shaped, in such a way that the pivot stop 166, during the pivot movements in the pivot directions 176 and 178, is also moved with the ball neck receiving body 32, unhindered, along this side of the stop support as far as a basic position in the rest position or as far as the end stop 162 in the working position.

It is thus possible for the ball neck receiving body 32, without the insertion portion 36 of the ball neck 34 inserted into the ball neck receptacle 66, to pivot between the working position, shown by way of example in FIGS. 1 to 12, and the rest position shown by way of example in FIGS. 13 and 17, wherein, as the ball neck receiving body 32 is pivoted from the rest position into the working position in the pivot direction 178, the pivot movement is delimited by the cooperation of the end stop 162 with the pivot stop 166.

As can be seen for example from FIGS. 1 to 12 and 13 to 17, the ball neck receiving body 32 is lifted by the pivoting in the pivot direction 176 about the pivot axis 112 with the end 132 opposite the insertion opening 62 and pivoted in the direction towards the crossmember 22, and at the same time the end face 58 with the insertion opening 62 initially moves downwards away from the lower edge 52 of the bumper unit 50 and thus also from the plane 56, but is then raised by being pivoted further, so that, ultimately, in the rest position shown by way of example in FIGS. 13 to 17, the insertion opening 62 is raised to such an extent that the end face 58 of the ball neck receiving body 32 having the insertion opening 62 faces the road surface 54 and is the lowest region of the ball neck receiving body 32 and, in addition, is arranged at a greater spacing from the road surface 54 than the lowest region 198, facing the road surface, of the ball neck receiving body 32 in the working position, wherein this lowest region 198 based on the working position is preferably formed by a side of the ball neck receiving body 32 facing the road surface 54 in the working position.

Figure 16:
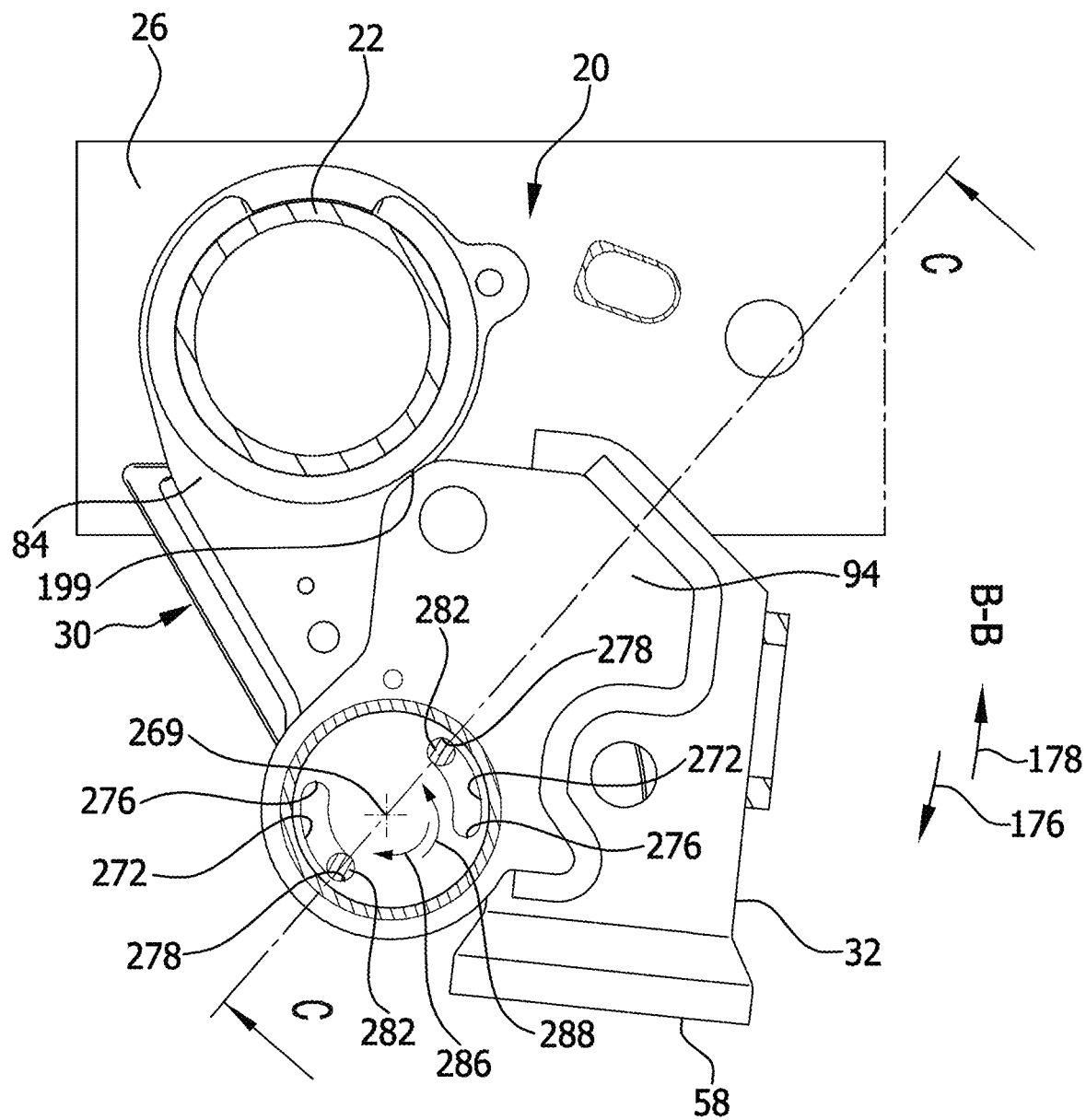
FIG. 16 shows a sectional representation according to the section B-B shown in FIG. 15.

In particular, as shown by way of example in FIG. 16, in the rest position, the ball neck receiving body 32 bears directly or for example indirectly by means of the bearing elements 92, 94 against a stop 199 fixedly connected to the holding unit 32, wherein the ball neck receiving body 32 is hereby fixed in the rest position in at least one pivot direction 176, 178, in particular at least in the pivot direction 176 oriented opposite to the direction from the rest position towards the working position.

For example, the stop 199 is formed by the side parts 81, 84 or the support carrier 154.

In the rest position, the end face 58 preferably lies in a plane 204 running at least approximately parallel to the road surface 54 and having a greater spacing from the roadway 54 than the center axis 68 of the ball neck receptacle 66 in the working position of the ball neck receiving body 32.

For example, the ball neck receiving body 32, in the rest position, as shown in FIGS. 15 and 16, lies in front of the pivot axis 112, as viewed in the direction of forward travel of the motor vehicle 10, and thus on a side of the pivot axis 112 closest to the rear-end region 14 of the body 12.

In particular, it is provided here that the center axis 68 of the ball neck receptacle 66, in the rest position, runs at least approximately parallel to the vertical 128 when a motor vehicle 10 provided with the trailer device 20 is arranged on a horizontal road surface.

These positions of the ball neck receiving body 32 both in the working position and in the rest position are achievable in particular in that the support carrier 154 with the stop support 152 and in particular the stop element 122 and the end stop 162 are dimensioned in such a way that these parts are arranged outside the path of the ball neck receiving body 32 and in particular of the bearing elements 92, 94 and the pivot stop 166 during pivoting between working position and rest position and in particular the stop support 152 and in particular also the stop element 122 can project into the ball neck receptacle 66 during the pivot movement into the rest position.

In addition, the pivoting of the ball neck receiving body 32 about the pivot axis 112 between rest position and working position is achievable in particular in that the pivot axis 112 in the working position of the ball neck receiving body 32 lies on a side of the ball neck receiving body 32 furthest away from the road surface 54 and in addition, as considered in the vertical 128, above a region of the ball neck receiving body 32 which extends from the end face 58, has the through openings 72 for the fixing pin 75, and extends parallel to the center axis 68, at most as far as a longitudinal center of the ball neck receiving body 32.

In addition, the trailer device 20 comprises a drive, which is denoted as a whole by 210 and which is coupled to the ball neck receiving body 32 by means of a coupling unit denoted as a whole by 212.

Figure 9:
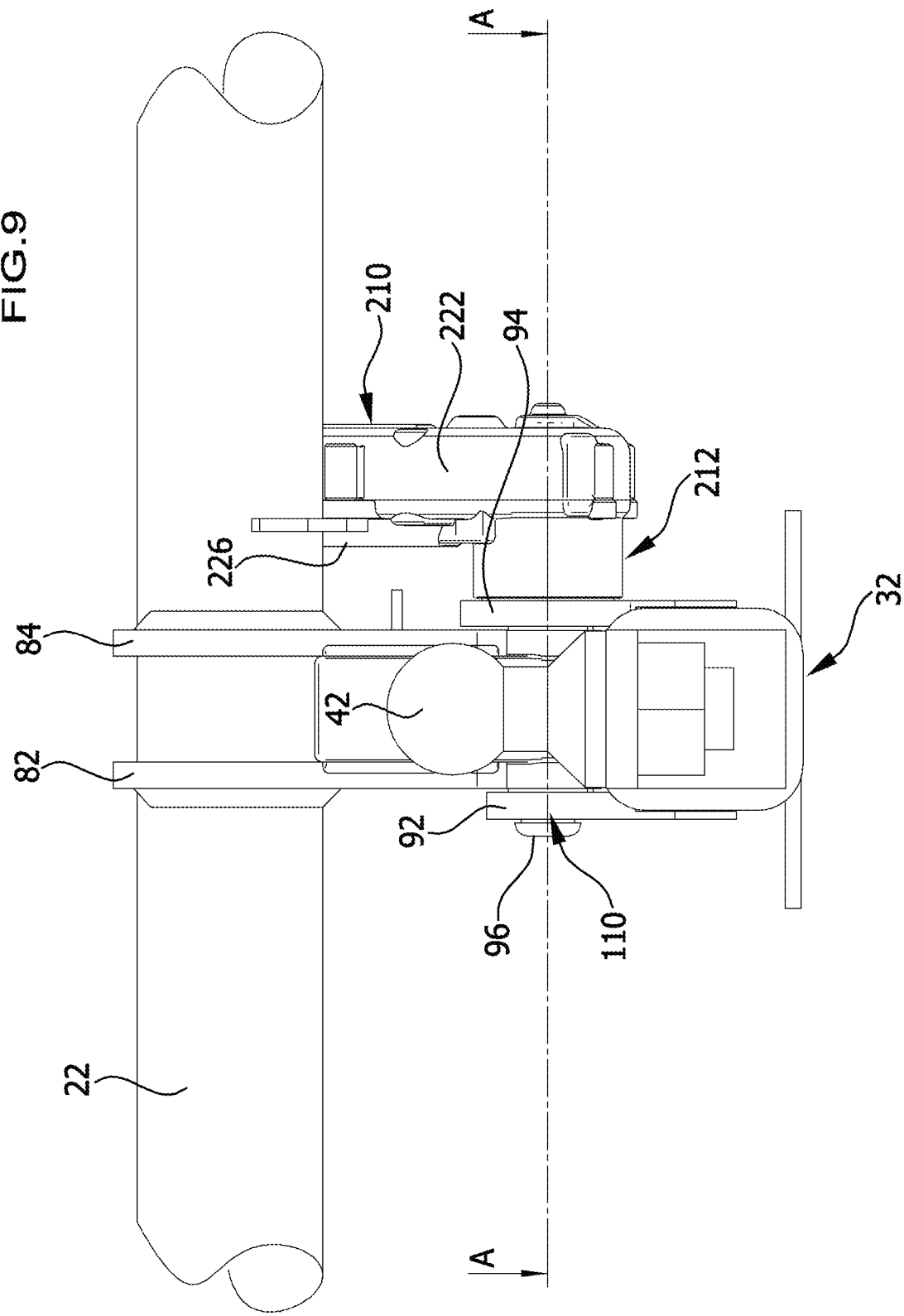
FIG. 9 shows a representation similar to FIG. 4 of the trailer device with inserted ball neck.

The drive 210 comprises a drive housing 222, in which a drive motor 224 is arranged, and which for example is attached by means of an attachment element 226 to the crossmember 22, as is shown for example in FIGS. 2, 3 and 9.

A drive element 232 constructed as a drive pin can be set in rotation about a rotation axis 234 by means of the drive motor 224, as is shown for example in FIGS. 5, 7, 10, 12, 15 and 17.

In particular, the rotation axis 234 runs at least approximately parallel to the pivot axis 112 and preferably coincides therewith.

The drive pin 232 forming the drive element is in particular connected for conjoint rotation to a drive-side coupling element 238 of the coupling unit 212, as is shown by way of example in FIGS. 3, 3*b*, 5, 7, 10, 12, 15 and 17, wherein for example the drive pin 232 engages in a pin receptacle 242 of the drive-side coupling element 238 and a lateral outer surface of the drive pin 232 running coaxially with the rotation axis 234 is profiled and cooperates with a profiling of the pin receptacle 242 for expedient fixing and transfer of rotary movement.

Furthermore, the coupling unit 212 has a coupling element 252 on the ball neck receiving body, which coupling element is referred to in the foregoing and hereinafter also as a receptacle-side coupling element 252, which is connected at least force-transmittingly to the ball neck receiving body 32 and is also connected to the ball neck receiving body 32 in such a way that the receptacle-side coupling element 252 transfers a rotary movement thereof to the ball neck receiving body 32.

The receptacle-side coupling element 252 is expediently arranged in the region of the bearing pin 96 and for example has a recess 256, in which the bearing pin 96 engages, in particular by a pin head thereof, as is shown by way of example in FIGS. 5, 7, 10, 12, 15 and 17, however, the bearing pin 96 and the receptacle-side coupling element 252, in particular in the variants in which the ball neck receiving body 32 is freely pivotable relative to the bearing pin 96, are not connected to one another in a torque-transmitting or positive-locking manner, but instead are rotatable relative to one another about the pivot axis 112, and for this purpose the recess 256 is dimensioned so as to be large enough for the bearing pin 96 to be able to rotate in said recess about the pivot axis 112 relative to the receptacle-side coupling element 252, without entraining the coupling element 252.

The receptacle-side coupling element 252 is attached on an attachment side 258 thereof to one of the bearing elements 92, 94, for example the bearing element 94, for example is welded on or screwed on, so that the coupling element 252 transfers a rotary movement in particular about a coupling axis 269 of the coupling unit 212 to the bearing element 92, 94 and therefore also to the ball neck receiving body 32.

The coupling unit 212 has a freewheel, by which a relative rotation in the coupling unit 212 about the coupling axis 269 within a predefined angular range of free rotation is permitted. To this end, the drive-side coupling element 238 and the receptacle-side coupling element 252 are mounted within the predefined angular range of free rotation rotatably relative to one another about the coupling axis 269.

In particular, the coupling unit 212 is in a freewheeling state corresponding to the freewheel when the drive-side coupling element 238 and the receptacle-side coupling element 252 are positioned relative to one another within the angular range of free rotation and are in a force-transmitting coupling state, in which in particular the coupling unit transfers force and transfers a rotary movement about the coupling axis 269 when the drive-side coupling element 238 and the receptacle-side coupling element 252 are positioned relative to one another at one of the ends of the angular range of free rotation.

The coupling axis 269 preferably runs at least approximately parallel to the pivot axis 112 and the drive rotation axis 234, wherein in particular these axes 112, 234, 269 coincide at least approximately. A rotary movement effected by the drive 210 is thus transferred in the active coupling state from the coupling unit 212 to the ball neck receiving body 32 and influences the pivot movement of the latter about the pivot axis 112.

The drive-side coupling element 238 and the receptacle-side coupling element 252 are in particular constructed as positive-locking elements engaging in one another, which bear against one another in a positive-locking manner on their respective coupling sides 246 and 266, at least in two coupling fit relative positions, and between these have a freewheel in relation to one another, such that they are mounted at a predefined angular range relative to one another between the two coupling fit relative positions so as to be movable rotatably along a guide path about the coupling axis 269.

The coupling side 264 of the drive-side coupling element 238 is preferably a side opposite the side provided with the pin receptacle 242, in particular based on axial directions of the coupling axis 269 and the 234 rotation axis, and the coupling side 266 of the receptacle-side coupling element 252 is expediently a side opposite the attachment side, in particular based on the coupling axis 269 and the pivot axis 112.

One of the coupling elements 238, 252, here the receiving-side coupling element 252, has, on its coupling side 264, 266, a guide receptacle 272, which for example comprises two guide portions 274a, 274b, which are open towards the coupling side 264, 266. The coupling element 238, 252 in particular having the guide receptacle 272 is referred to hereinafter as the receiving coupling element 252.

The guide portions 274 run arcuately in respective guide angular ranges around the coupling axis 269 and therefore, here too, at least approximately around the rotation axis 234 and the pivot axis 112, wherein corresponding enclosed angles of the guide angular ranges are of equal size and the guide portions 274a, 274b are arranged offset from one another about the coupling axis 269 in a rotation direction, in particular are arranged and constructed substantially in a mirror image with respect to a plane of symmetry running through the coupling axis 269. In particular, the guide angular range corresponds at least approximately to the predefined angular range of free rotation and defines this. The guide portions 274 between their respective ends 276 and 278, i.e. the guide portion 274a between its ends 276a and 278a and the guide portion 274b between its ends this 276b and 278b, thus run at least approximately in an arc shape, wherein the center point of the arc lies at least approximately on the coupling axis 269 and geometric connection lines between the center point and each end 276, 278 of the respective guide portion 274 enclose a guide angle which corresponds at least approximately to the angle of the predefined angular range and defines this.

The other coupling element 238, here the drive-side coupling element, comprises coupling bodies 282 engaging in the guide receptacle, more specifically in particular a coupling body 282 for each guide portion 274, that is to say in the present case two coupling bodies 282a and 282b, which engage in the relevant corresponding guide portions 274a and 274b respectively, wherein for example the coupling bodies 282 are constructed in a pin-like manner extending away from the coupling side 264.

The coupling element 238, 252 engaging with one or more coupling bodies 282 in the receiving coupling element, in particular having the guide receptacle 272, will also be referred to hereinafter as the engaging coupling element 238.

The coupling bodies 282 are mounted in the guide receptacle 272 so as to be guided movably within the predefined angular range, and therefore here within the guide angular range, relative to the guide receptacle 272 along the guide path.

In particular, the coupling bodies 282a and 282b are arranged symmetrically to one another on the coupling side 238, in particular in a mirror image in respect of the plane of symmetry running through the coupling axis 269, and in a manner corresponding to the guide portions 274a and 274b, in such a way that if one of the coupling bodies 282a, 282b bears against the front end 276a, 276b of its corresponding guide portion 274a, 274b, based on a rotation direction 286 about the coupling axis 269, the other coupling body 282b, 282a also bears against the front end 276b, 276a of its corresponding guide portion 274b, 274a, based on the rotation direction 286, and accordingly, in the case of this coupling fit relative position, a positive-locking fit is present between the coupling elements 238, 252 in the event of a movement of the engaging coupling element 238 in the rotation direction 286, and the engaging coupling element 238 entrains the receiving coupling element 252. On the other hand, in the event of this coupling fit relative position present on the engagement side, based on this rotation direction 286, a pivoting of the receiving coupling element 252 in the rotation direction 286 relative to the engaging coupling element 238 is possible, without entraining the receiving coupling element 238, and a free rotation of the engaging coupling element 238 in this coupling fit relative position on the engagement side, based on the rotation direction 286, in a rotation direction 288 opposite the rotation direction 286 relative to the receiving coupling element 252 is also possible without entrainment of the latter, since, in the event of a rotary movement of this kind of the engaging coupling element 238, the coupling bodies 282 in the guide receptacle 272 have a free movability at least within the guide angular range.

In addition, the arrangement of the coupling bodies 282 in such a way that, if one of the coupling bodies 282a, 282b bears in the opposite rotation direction 288 against the front end 278a, 278b, based on this rotation direction 288, of its corresponding guide portion 274a, 274b, the other coupling body 282b, 282a also bears against the front end 278b, 278a, based on the rotation direction 288, of its corresponding guide portion 274b, 274a, and therefore, based on the rotation direction 288, based on a rotary movement of the engaging coupling element 238 in the rotation direction 288 in this coupling fit relative position, a positive-locking fit is present between the coupling elements 238 and 252, and, in the event of a movement in the rotation direction 288 in this coupling fit relative position on the engagement side, based on the rotation direction 288, the engaging coupling element 238 entrains the receiving coupling element 252. Accordingly, however, in this coupling fit relative position on the engagement side, based on the rotation direction 288, a rotary movement of the receiving coupling element 252 in this rotation direction 288 relative to the engaging coupling element 238 without entrainment thereof is possible, since, for a rotary movement of this kind, the coupling bodies 282 are mounted in the guide receptacle 272 so as to be freely movable at least within the guide angular range in this position. Accordingly, in the coupling fit relative position on the engagement side, based on the rotary direction 288, a rotary movement of the engaging coupling element 238 in the rotation direction 286 opposite the rotation direction 288 relative to the receiving coupling element 252 is also possible without entrainment of the latter, since in this position in relation to a movement of this kind, the coupling bodies 282 are mounted so as to be movable relative to the receiving coupling element 252 in the guide receptacle 272.

The coupling elements 238 and 252 thus form a coupling unit with freewheel between the drive 210 and the ball neck receiving body 32, in which the coupling elements 238, 252 are mounted rotatably movably relative to one another, at least in some regions, whereby a relative movement between the two coupling elements 238 and 252 about the coupling axis 269 within the predefined angular range of free rotation relative to one another is possible, and, at corresponding ends of the predefined angular range of free rotation, the coupling elements 238, 252 form a mutual stop, which blocks a relative rotary movement in a respective rotation direction 286, 288 at the corresponding end, and, in this coupling fit relative position, in the event of a rotary movement in the respective rotation direction 286, 288 about the coupling axis, one of the coupling elements 238, 252 entrains the other coupling element 252, 238.

In particular, the coupling unit 212, by means of its construction explained above, satisfies one or more of the advantageous functions explained hereinafter.

If the drive-side coupling element 238 is moved by the drive motor 224 in a rotation direction 286, 288 corresponding to the pivot direction 176 oriented from the working position into the rest position, in this case the rotation direction 288, if the ball neck receiving body is positioned in its working position, the drive-side coupling element 238 thus moves, as applicable, relative to the receptacle-side coupling element 252 into the corresponding coupling fit relative position, in this case the coupling fit relative position on the engagement side, based on the rotation direction 288, and, in the event of a further rotary movement of this kind, entrains the receptacle-side coupling element 252, which, as a result of its connection to the ball neck receiving body 32 for conjoint rotation, entrains the latter in a corresponding rotary movement, that is to say a pivot movement about the pivot axis 112 from the working position into the rest position. It is thus possible, by means of the drive 210, to move the ball neck receiving body 32 from the working position into the rest position. In particular, a rotary movement into the rest position occurs until the ball neck receiving body 32 bears directly or indirectly against the stop 199.

In a position corresponding to the rest position, the drive-side coupling element 238 is in a receptacle-side coupling fit relative position in relation to a rotation direction 286, 288 corresponding to the pivot direction 178 oriented from the rest position into the working position, in this case in relation to the rotation direction 286, in which coupling fit relative position the receptacle-side coupling element 252 in particular is not mounted freely in the corresponding rotation direction, here the rotation direction 286, relative to the drive-side coupling element 238, since the rear ends 278a, b, based on this rotation direction 286, of the guide portions 274a, b form a stop and bear against the corresponding coupling bodies 282a, 282b, and therefore this coupling fit relative position corresponds to the engagement-side coupling fit relative position, based on the rotation direction 288, explained further above.

A pivoting of the ball neck receiving body 32 from the rest position at least in the direction towards the working position is thus hereby blocked by the coupling unit 212, provided the drive-side coupling element 238 is hindered in rotating about the coupling axis 269, for example by a stationary drive 210. In particular, in addition a pivoting in the opposite direction is prevented by the stop 199, against which the ball neck receiving body 32 bears directly or indirectly. Although the ball neck receiving body 32 is actually preferably mounted so as to be freely pivotable about the pivot axis 112 relative to the holding unit 30, at least in some regions, as explained further above, the ball neck receiving body 32 is thus fixed in the rest position, more specifically in such a way that the ball neck receiving body 32, in the rest position with a trailer device 20 correctly mounted on a motor vehicle and provided the motor vehicle 10 is on an at least approximately horizontal road surface, is loaded by the force of gravity in the direction towards the working position.

If the drive-side coupling element 238 is now moved by the drive motor 224 in a rotation direction 286, 288 corresponding to the pivot direction 178 oriented from the rest position into the working position, in this case the rotation direction 286, the ball neck receiving body 32 is thus released from the coupling unit 212 in the rest position and can pivot in the direction of the pivot direction 178, in particular loaded by the force of gravity, wherein a rotary movement of the drive-side coupling element 238 induced by the drive motor 224 is preferably slower than the substantially free-falling pivot movement of the ball neck receiving body 32 from the rest position into the working position would be, so that, provided the ball neck receiving body is not stuck in the rest position as a result of undesirable interfering influences, the ball neck receiving body 32 remains in the coupling fit relative position on the receptacle side, based on the rotation direction corresponding to the pivot direction 178 oriented from the rest position into the working position, in this case the rotation direction 286, in which coupling fit relative position on the receptacle side the rear ends 278a, b, based on the rotation direction 286, of the guide portions 274a, b bear against the corresponding engaging coupling bodies 282a, b, and, due to the slower rotary movement of the drive-side coupling element 238, the unit formed of receptacle-side coupling element 252 and ball neck receiving body 32 is thus braked in respect of its pivot movement in the direction towards the working position to the slower rotary movement of the drive-side coupling element 238, and therefore in particular the ball neck receiving body 32 is moved into the working position with greater damping and more gently.

If, however, a pivot movement of the ball neck receiving body 32 into the working position is blocked in a different way, for example by a finger of a user of the trailer device 20 positioned in the pivot path of the ball neck receiving body 32 and its parts connected thereto and also pivoted at the same time, the driven drive-side coupling element 238 continues its rotary movement in the corresponding rotation direction, here the rotation direction 286, but without transferring the rotary movement to the ball neck receiving body 32 due to the freewheel in the coupling unit 212, since the coupling bodies 282 in this arrangement are movable in the guide receptacle 72 relative thereto. In spite of the blocked pivot path, damage to the blocking part that might otherwise occur, in particular a trapping of the finger, or possibly damage to the trailer device, for example the ball neck receiving body or the pivot bearing unit, can thus be reduced or even avoided entirely, since the ball neck receiving body can stop its pivot movement and is not entrained further with the rotary movement of the drive motor and of the drive-side coupling element 238 in spite of the blocking.

If, however, in other situations the ball neck receiving body 32 becomes stuck in the rest position due to interfering influences, although the fixing in the rest position by the coupling unit 212 is overridden by correspondingly setting the drive-side coupling element 238 in rotation by the drive motor 224 in the rotary direction corresponding to the pivot movement 178 oriented from the rest position into the working position, here the rotary direction 286, wherein the interfering influences are, for example, frictional influences on the ball neck receiving body or parts connected thereto resulting from soiling and/or wear, the driven drive-side coupling element 238 thus initially continues, in the freewheel, its relative movement in relation to the unit formed of ball neck receiving body 32 and receptacle-side coupling element 252, until the coupling elements 238, 252 reach the coupling fit relative position on the drive side based on the corresponding rotation direction, here the rotation direction 286, in which coupling fit relative position the coupling bodies 282a, b, in their respective guide portions 274a, b, come into contact with the front ends 276a, b in this rotation direction 286, which form a stop, and transfer the rotary movement to the receptacle-side coupling element 252 and thus also to the ball neck receiving body 32, and preferably thus help at least to overcome the external undesirable interfering influences in this situation, and entrain the ball neck receiving body 32 from the rest position.

Depending on the type and strength of the external interfering influences, it may be sufficient that the interfering influences, in particular a static friction thereof, are substantially overcome by this initial rotary movement transfer and the ball neck receiving body 32, with its parts connected to it, starts its pivot movement in the direction towards the working position, accelerated in particular by the force of gravity, and then, similarly to the way explained above, is braked by the coupling unit 212 in respect of its pivot movement accelerated by the force of gravity and is moved gently into the working position. If, however, the interfering influences in this situation are persistent, such that the ball neck receiving body 32 is not freely pivoted into the working position as a result of the force of gravity, the drive 210 thus entrains the ball neck receiving body by means of the coupling unit 212 at least over a wide angular range in the direction towards the working position, until the drive and therefore also the drive-side coupling element 238 assume their position corresponding to the working position. If the ball neck receiving body 32 is not yet positioned in the working position, a user of the trailer device 20 must still move the ball neck receiving body 32 by hand only through the last remaining angular range into the working position. In particular, this angular range, which is still to be negotiated by the user, corresponds substantially to the previously defined angular range of free rotation, since the drive 210 is preferably set up in such a way that the coupling unit 212, when the ball neck receiving body is positioned in the working position, is in the coupling fit relative position on the drive side, based on the rotation direction c corresponding to the pivot direction 176 oriented from the working position to the rest position, in this case the rotation direction 288, and therefore the coupling receiving body 32 has the greatest possible free pivotability from the working position towards the rest position, so as to allow the greatest possible free pivotability specifically in this region which is particularly easily accessed by a user, for example so as to best prevent the user's fingers from becoming trapped in this critical region.

The invention claimed is:

1. A trailer device for a motor vehicle, comprising a holding unit for a crossmember mountable on a vehicle body on the rear-end side thereof and a ball neck receiving body having a ball neck receptacle, into which an insertion portion of a ball neck carrying a coupling ball is insertable and fixable, wherein the ball neck receiving body is arranged mounted on the holding unit so as to be pivotable at least between a working position, in which a ball neck is insertable by means with its insertion portion into the ball neck receptacle, and a rest position, wherein the trailer device comprises a drive, which is coupled to the ball neck receiving body by a coupling unit which has a freewheel.

2. The trailer device according to claim 1, wherein the ball neck receiving body is loaded by a force in the direction towards the working position.

3. The trailer device according to claim 2, wherein the force is effective until the ball neck receiving body has reached the working position.

4. The trailer device according to claim 1, wherein the coupling unit has one coupling state or a plurality of coupling states, wherein in at least one coupling state the coupling unit force-transmittingly connects the drive and the ball neck receiving body at least in one coupling direction to influence a movement of the ball neck receiving body, and, by means of its freewheel, allows at least one relative movement between the ball neck receiving body and the drive in a freewheel direction, wherein the coupling direction and the free wheeling direction are oriented oppositely to one another.

5. The trailer device according to claim 1, wherein the coupling unit, in at least one coupling state, counteracts a pivoting of the ball neck receiving body, effected by a loading with a force, into the working position.

6. The trailer device according to one claim 1, wherein the coupling unit, in at least one coupling state, transmits a guiding movement from the drive to the ball neck receiving body.

7. The trailer device according to claim 1, wherein, in at least one coupling state transferring a guiding movement, the drive together with the coupling unit guides the ball neck receiving body in the direction towards the working position, thereby acting in a braking manner on a movement in the direction towards the working position of the ball neck receiving body effected as a result of a loading of the ball neck receiving body with a force.

8. The trailer device according to claim 1, wherein, in at least one coupling state transferring a guiding movement, the drive together with the coupling unit moves the ball neck receiving body in a force-loaded manner out from the rest position in the direction towards the working position.

9. The trailer device according to claim 1, wherein, in at least one coupling state transferring a guiding movement, the drive together with the coupling unit moves the ball neck receiving body in a guided and force-loaded manner in the direction towards the rest position.

10. The trailer device according to claim 1, wherein the freewheel of the coupling unit permits a limited relative movement between the drive and the ball neck receiving body.

11. The trailer device according to claim 1, wherein the freewheel of the coupling unit, in at least one coupling state, permits a movement, effected by the drive, in the direction towards the working position relative to the ball neck receiving body.

12. The trailer device according to claim 1, wherein, in at least one coupling state with a ball neck receiving body blocked in respect of its pivotability, the coupling unit is placed in a freewheeling state.

13. The trailer device according to claim 1, wherein the coupling unit and the ball neck receiving body are constructed in such a way that, when the ball neck receiving body is positioned in the rest position, the coupling unit is in a force-transmitting coupling state and fixes the ball neck receiving body in the rest position.

14. The trailer device according claim 1, wherein the coupling unit, as a result of the freewheel, at least over a freewheel range which represents part of the pivot path between the rest position and the working position, permits a pivoting of the ball neck receiving body about a pivot axis relative to the drive.

15. The trailer device according to claim 1, wherein, in the working position, the coupling unit, as a result of the freewheel, at least over a freewheel range which represents part of the pivot path between the rest position and the working position, permits a pivoting of the ball neck receiving body in the direction towards the rest position.

16. The trailer device according to one claim 1, wherein at least two coupling elements of the coupling unit are constructed as positive-locking elements engaging in one another, which have a positive-locking fit depending on their relative positions in relation to one another which can be adopted in the coupling unit.

17. The trailer device according to claim 1, wherein at least one coupling element of the coupling unit has a guide receptacle, in which at least one further coupling element of the coupling unit engages.

18. The trailer device according to claim 1, wherein at least one coupling element of the coupling unit forms a stop, by which the ball neck receiving body is set in the rest position, at least with respect to a movement in the direction towards the working position.

19. The trailer device according to claim 1, wherein the ball neck receiving body, in the working position and almost as far as the rest position, is arranged on the holding unit so as to be freely pivotable relative thereto at least within the freewheel range.

20. The trailer device according to claim 1, wherein, at least in an operating state, the ball neck receiving body in the rest position is arranged higher than in the working position based on the direction of the force of gravity.

21. The trailer device according to claim 1, wherein, at least in an operating state, the ball neck receiving body in the working position is arranged beneath the pivot axis based on the direction of the force of gravity.

22. The trailer device according to claim 1, wherein at least one stop element by which, in cooperation with an insertion portion of a ball neck inserted into the ball neck receptacle, the ball neck receiving body is fixed together with the inserted insertion portion non-rotatably about the pivot axis.

23. The trailer device according to claim 1, wherein a pivot stop is fixedly arranged on the ball neck receiving body and, together with an end stop fixedly arranged on the holding unit, in the working position counteracts a pivoting of the ball neck receiving body from the working position in a pivot direction opposite the direction towards the rest position and blocks this rotary movement.

24. The trailer device according to claim 1, wherein the drive is a rotary drive.

25. The trailer device of claim 1, wherein the trailer device comprises a sensor which is constructed to detect whether the ball neck is inserted with its insertion portion in the ball neck receptacle of the ball neck receiving body positioned in the working position at least over a minimal extent necessary to fix the ball neck in the ball neck receptacle.

26. The trailer device according to claim 25, wherein the insertion portion inserted at least over the minimal extent at least contributes to a blocking of the pivoting of the ball neck receiving body from the working position in at least one pivot direction in the direction towards the rest position.

27. The trailer device according to claim 1, wherein the trailer device also comprises the crossmember.

28. A motor vehicle comprising the trailer device according to claim 1.

29. A motor vehicle comprising the trailer device of claim 25.

* * * * *